US012782112B2

(12) United States Patent
Sato

(10) Patent No.: US 12,782,112 B2
(45) Date of Patent: Nov. 3, 2026

(54) POSITION-MEASURING DEVICE, POSITION-MEASURING SYSTEM, AND MEASURING DEVICE

(71) Applicant: NIKON CORPORATION, Tokyo (JP)

(72) Inventor: Shinji Sato, Fukaya (JP)

(73) Assignee: NIKON CORPORATION, Tokyo (JP)

( * ) Notice: Subject to any disclaimer, the term of this patent is extended or adjusted under 35 U.S.C. 154(b) by 316 days.

(21) Appl. No.: 18/568,289

(22) PCT Filed: Jun. 11, 2021

(86) PCT No.: PCT/JP2021/022365
§ 371 (c)(1),
(2) Date: Jul. 23, 2024

(87) PCT Pub. No.: WO2022/259538
PCT Pub. Date: Dec. 15, 2022

(65) Prior Publication Data
US 2024/0393101 A1 Nov. 28, 2024

(51) Int. Cl.
*G01B 11/00* (2006.01)
*B25J 9/16* (2006.01)
*G01H 17/00* (2006.01)

(52) U.S. Cl.
CPC ........... *G01B 11/005* (2013.01); *B25J 9/1694* (2013.01); *G01H 17/00* (2013.01)

(58) Field of Classification Search
CPC ....... G01B 11/002; G01B 11/24; G01B 11/25; G01B 11/14; G01B 21/042; G01B 11/272;
(Continued)

(56) References Cited

U.S. PATENT DOCUMENTS 7,800,758 B1 * 9/2010 Bridges .................. G01B 11/03 356/482
9,175,950 B2 * 11/2015 Collis .................... G01B 11/14
(Continued)

FOREIGN PATENT DOCUMENTS

CN 112424563 A * 2/2021 ............. G01S 17/66
EP 2511658 A1 * 10/2012 ............. G01S 19/11
(Continued)

OTHER PUBLICATIONS

Japanese Office Action issued Jan. 7, 2025 in corresponding Japanese Patent Application No. 2023-526817, 16 pages.
(Continued)

*Primary Examiner* — Michael P Stafira
(74) *Attorney, Agent, or Firm* — XSENSUS LLP

(57) ABSTRACT

A position measurement device includes a movement device capable of movement, a position measurement unit including an irradiation unit configured to irradiate measurement light to a reflective element arranged on a movable unit of a robot, a light reception unit configured to receive reflected light from the reflective element, a position information acquisition unit configured to acquire position information of the reflective element, and a movement unit configured to change an irradiation direction of the measurement light, an imaging unit, and a transmission unit configured to transmit the position information acquired by the position information acquisition unit or adjustment information of the robot based on the position information to a control system of the robot. The movement device moves at least one of the irradiation unit, the light reception unit, the movement unit, and the imaging unit. The movement unit is controlled so that one or both of at least a part of the robot and the reflective element are imaged using the imaging unit and the
(Continued)

measurement light is irradiated to the reflective element on the basis of an imaging result of the imaging unit.

20 Claims, 18 Drawing Sheets

(58) Field of Classification Search
CPC ................ G01B 11/2545; G01B 5/008; G01B 11/2513; G01B 7/003; G01B 11/00; G01B 11/026; G01B 11/26; G01B 21/045; G01B 11/005; G01B 11/03; G01B 7/004; G01B 21/00; G01B 5/0004; G01B 5/0002; G01B 7/30; G01B 21/047; G01B 21/16; G01B 9/02028; G01B 11/16; G01B 11/2518; G01B 11/254; G01B 11/0608; G01B 11/2504; G01B 21/02; G01B 2210/52; G01B 7/023; G01B 11/02; G01B 15/00; G01B 15/04; G01B 9/02091; G01B 11/303; G01B 5/28; G01B 11/06; G01B 11/08; G01B 9/02007; G01B 21/22; G01B 7/22; G01B 11/2433; G01B 11/245; G01B 11/30; G01B 2210/56; G01B 5/06; G01B 5/20; G01B 11/165; G01B 21/32; G01B 9/0203; G01B 9/02092; G01B 11/2522; G01B 11/27; G01B 21/04; G01B 3/18; G01B 5/0014; G01B 5/004; G01B 7/00; G01B 7/287; G01B 9/02; G01B 9/08; G01B 11/2441; G01B 17/00; G01B 2290/70; G01B 5/205; G01B 7/008; G01B 7/105; G01B 17/02; G01B 3/008; G01B 3/20; G01B 3/28; G01B 5/02; G01B 5/08; G01B 5/285; G01B 7/28; G01B 11/0625; G01B 11/18; G01B 11/22; G01B 21/30; G01B 5/0007; G01B 5/0016; G01B 5/0025; G01B 7/14; G01B 7/293; G01B 7/31; G01B 9/02011; G01B 9/02047; G01B 9/02076; G01B 9/023; B25J 9/023; B25J 9/1697; B25J 9/1664; B25J 9/1692; B25J 13/08; B25J 19/023; B25J 9/163; B25J 9/1633; B25J 13/085; B25J 9/1679; B25J 11/00; B25J 9/161; B25J 9/1694; B25J 9/1674; B25J 9/1602; B25J 9/1612; B25J 9/1682; B25J 9/0084; B25J 9/1666; B25J 9/1676; B25J 5/007; B25J 9/1689; B25J 9/16; B25J 9/1687; B25J 15/0019; B25J 13/088; B25J 9/042; B25J 9/06; B25J 19/02; B25J 13/089; B25J 15/0616; B25J 9/162; B25J 9/1671; B25J 9/0009; B25J 11/005; B25J 11/0095; B25J 19/021; B25J 9/1653; B25J 9/1638; B25J 9/1661; B25J 15/0052; B25J 9/0087; B25J 5/00; B25J 13/06; B25J 9/1684; B25J 18/00; B25J 9/1656; B25J 9/1669; B25J 19/06; B25J 9/0093; B25J 13/00; B25J 9/10; B25J 9/0081; B25J 9/046; B25J 9/1651; B25J 19/00; B25J 19/022; B25J 5/02; B25J 9/0096; B25J 13/006; B25J 15/04; B25J 17/00; B25J 9/104; B25J 15/08; B25J 9/1641; B25J 9/00; B25J 9/126; B25J 9/04; B25J 17/02; B25J 9/106; B25J 9/102; B25J 18/04; B25J 9/1635; B25J 9/1065; B25J 15/00; B25J 19/0025; B25J 9/043; B25J 11/0075; B25J 9/1615; B25J 9/1628; B25J 9/1605; B25J 19/0004; B25J 11/008; B25J 13/02; B25J 15/0014; B25J 9/1607; B25J 13/081; B25J 15/0491; B25J 13/086; B25J 13/084; B25J 15/0066; B25J 11/0045; B25J 9/08; B25J 5/005; B25J 19/0029; B25J 19/04; B25J 9/02; B25J 15/0028; B25J 9/0018; B25J 15/0061; B25J 15/0253; B25J 11/0055; B25J 9/0003; B25J 13/087; B25J 21/00; B25J 19/0091; B25J 9/12; B25J 18/007; B25J 9/009; B25J 17/0208; B25J 13/025; B25J 3/04; B25J 3/00; B25J 15/0033; B25J 18/02; B25J 19/0095; B25J 15/0004; B25J 15/0408; B25J 15/06; B25J 9/044; B25J 9/1643; B25J 9/026; B25J 13/065; B25J 15/02; B25J 17/0258; B25J 18/025; B25J 19/0075; B25J 9/0021; B25J 11/009; B25J 15/10; B25J 9/047; B25J 11/002; B25J 11/0085; B25J 9/1658; B25J 19/005; B25J 5/04; B25J 11/0005; B25J 9/142; B25J 11/0065; B25J 19/063; B25J 9/108; B25J 18/06; B25J 15/0206; B25J 9/0072; B25J 15/0057; B25J 18/005; B25J 13/082; B25J 19/0008; B25J 19/0012; B25J 17/0241; B25J 17/0266; B25J 19/027; B25J 21/005; B25J 9/1005; B25J 9/107; B25J 13/003; B25J 15/0009; B25J 15/0475; B25J 9/041; B25J 15/0047; B25J 9/101; B25J 9/123; B25J 15/0683; B25J 17/0283; B25J 9/065; B25J 9/1075; B25J 5/026; B25J 19/007; B25J 9/1015; B25J 15/0416; B25J 17/0216; B25J 9/0048; B25J 15/0608; B25J 19/0045; B25J 19/026; B25J 9/0006; B25J 9/1045; B25J 19/0016; B25J 19/066; B25J 9/1035; B25J 9/1623; B25J 15/0038; B25J 15/0441; B25J 17/0233; B25J 9/144; B25J 15/0625; B25J 17/0275; B25J 9/003; B25J 15/0095; B25J 19/0033; B25J 19/0037; B25J 19/0058; B25J 9/0027; B25J 15/024; B25J 17/0291; B25J 19/061; B25J 11/003; B25J 19/0054; B25J 9/14; B25J 9/1646; B25J 17/0225; B25J 15/0023; B25J 15/0213; B25J 15/086; B25J 18/002; B25J 19/0041; B25J 15/002; B25J 15/0425; B25J 15/0458; B25J 9/1025; B25J 9/146; B25J 11/007; B25J 15/0266; B25J 15/12; B25J 19/028; B25J 15/103; B25J 19/002; B25J 19/0083; B25J 15/0071; B25J 15/009; B25J 15/0293; B25J 15/0658; B25J 17/025; B25J 19/0079; B25J 15/008; B25J 15/0433; B25J 9/045; B25J 1/00; B25J 11/006; B25J 15/0466; B25J 15/065; B25J 9/0051; B25J 9/0069; B25J 9/103; B25J 9/1617; B25J 11/0025; B25J 13/083; B25J 19/0062; B25J 19/0066; B25J 19/025; B25J 9/105; B25J 9/109; B25J 9/1648; B25J 9/20; B25J 11/0035; B25J 15/0273; B25J 15/0483; B25J 5/002; B25J 15/0085; B25J 15/0233; B25J 15/045; B25J 15/0666; B25J 15/0691; B25J 9/0015; B25J 9/0045;

B25J 9/0078; B25J 1/02; B25J 15/0226; B25J 15/0633; B25J 15/083; B25J 15/106; B25J 19/065; B25J 19/068; B25J 5/06; B25J 9/0012; B25J 9/0024; B25J 9/0033; B25J 9/0039; B25J 9/1085

See application file for complete search history.

(56) References Cited

U.S. PATENT DOCUMENTS

| | | | | |
|---|---|---|---|---|
| 9,964,398 | B2 * | 5/2018 | Becker | G01B 11/005 |
| 2010/0103431 | A1 | 4/2010 | Demopoulos | |
| 2010/0245587 | A1 | 9/2010 | Otani et al. | |
| 2014/0098383 | A1 | 4/2014 | Bridges | |
| 2015/0015895 | A1 * | 1/2015 | Bridges | G01B 11/005<br>356/614 |
| 2016/0327383 | A1 | 11/2016 | Becker et al. | |
| 2017/0276472 | A1 | 9/2017 | Becker et al. | |
| 2020/0171665 | A1 * | 6/2020 | Kono | B25J 13/089 |

FOREIGN PATENT DOCUMENTS

| | | | | |
|---|---|---|---|---|
| EP | 3825072 | A1 * | 5/2021 | F16B 11/006 |
| JP | 2001221635 | A | 8/2001 | |
| JP | 2003240549 | A | 8/2003 | |
| JP | 2010520075 | A | 6/2010 | |
| JP | 2010-237169 | A | 10/2010 | |
| JP | 2013183176 | A | 9/2013 | |
| JP | 5469899 | B2 * | 4/2014 | G01S 17/86 |
| JP | 2017019072 | A * | 1/2017 | G01S 7/481 |
| JP | 2018-515774 | A | 6/2018 | |
| WO | WO-0177613 | A1 * | 10/2001 | G01B 11/2545 |
| WO | 2007/002319 | A1 | 1/2007 | |
| WO | WO-2008107715 | A2 * | 9/2008 | B25J 9/1692 |

OTHER PUBLICATIONS

Korean Office Action issued Nov. 29, 2025 in corresponding Korean Patent Application No. 10-2024-7000224, 20 pages.

International Search Report issued Sep. 7, 2021 in corresponding International Patent Application No. PCT/JP2021/022365, 6 pages.

Written Opinion of the International Search Authority issued Sep. 7, 2021 in corresponding International Patent Application No. PCT/JP2021/022365, 10 pages.

Office Action issued Apr. 22, 2025 in corresponding Japanese Patent Application No. 2023-526817, 6 pages.

Extended European Search Report issued Apr. 11, 2025 in corresponding European Patent Application No. 21945210.9, 7 pages.

* cited by examiner

POSITION-MEASURING DEVICE, POSITION-MEASURING SYSTEM, AND MEASURING DEVICE

CROSS-REFERENCE TO RELATED APPLICATION

The present application is based on PCT filing PCT/JP2021/022365, filed Jun. 11, 2021, the entire contents of which are incorporated herein by reference.

TECHNICAL FIELD

The present invention relates to a position measurement device, a position measurement system, and a measurement device.

BACKGROUND ART

Robots and machine tools automatically perform processing and assembly steps. In these steps, it is necessary to measure a position of an arm of the robot to be controlled and a position of a tip of a spindle of a machine tool with high accuracy so that the accuracy of processing and assembly is improved. For example, a device for measuring a position of a predetermined part of a robot device using an external measurement device is known (Patent Document 1).

In the control of a robot, it is necessary to measure the position of the robot with high accuracy.

CITATION LIST

Patent Document

[Patent Document 1]
PCT International Publication No. WO 2007/002319

SUMMARY OF INVENTION

According to an aspect of the present invention, there is provided a position measurement device including: a movement device capable of movement; a position measurement unit including an irradiation unit configured to irradiate measurement light to a reflective element arranged on a movable unit of a robot, a light reception unit configured to receive reflected light from the reflective element, a position information acquisition unit configured to acquire position information of the reflective element, and a movement unit configured to change an irradiation direction of the measurement light; an imaging unit; and a transmission unit configured to transmit the position information acquired by the position information acquisition unit or adjustment information of the robot based on the position information to a control system of the robot, wherein the movement device moves at least one of the irradiation unit, the light reception unit, the movement unit, and the imaging unit, and wherein the movement unit is controlled so that one or both of at least a part of the robot and the reflective element are imaged using the imaging unit and the measurement light is irradiated to the reflective element on the basis of an imaging result of the imaging unit.

According to an aspect of the present invention, there is provided a position measurement device including: a position measurement unit including an irradiation unit configured to irradiate measurement light to a reflective element arranged on a movable unit of a robot, a light reception unit configured to receive reflected light from the reflective element, a position information acquisition unit configured to acquire position information of the reflective element on the basis of a light reception result of the light reception unit, and a movement unit configured to change an irradiation direction of the measurement light; an imaging unit configured to image one or both of at least a part of the robot and the reflective element; a transmission unit configured to transmit the position information acquired by the position information acquisition unit or adjustment information of the robot based on the position information to a control system of the robot; and a movement device capable of movement and including at least the irradiation unit, the light reception unit, the movement unit, and the imaging unit, wherein the movement unit is controlled so that the measurement light is irradiated to the reflective element on the basis of an imaging result of the imaging unit.

According to an aspect of the present invention, there is provided a position measurement system including a plurality of position measurement devices according to the above-described aspect.

According to an aspect of the present invention, there is provided a measurement device including: a movement device capable of movement; a first irradiation unit provided in the movement device and configured to irradiate first measurement light to a first reflective element provided in a measurement target object; a reference irradiation unit provided in the movement device and configured to irradiate reference measurement light to a reference reflective element relating to a reference position in a space where the movement device is arranged; and a measurement unit configured to acquire position information or distance information about the first reflective element for the reference position on the basis of first reflected light of the first measurement light from the first reflective element and reference reflected light of the reference measurement light from the reference reflective element.

According to an aspect of the present invention, there is provided a measurement device including: a movement device capable of movement; an irradiation unit provided in the movement device and configured to irradiate measurement light to a reference reflective element relating to a reference position in a space where the movement device is arranged and irradiate measurement light to a first reflective element provided in a measurement target object; and a measurement unit configured to acquire position information or distance information about the first reflective element for the reference position on the basis of first reflected light of the measurement light from the first reflective element and reference reflected light of the measurement light from the reference reflective element.

DESCRIPTION OF EMBODIMENTS

First Embodiment

Figure 1:
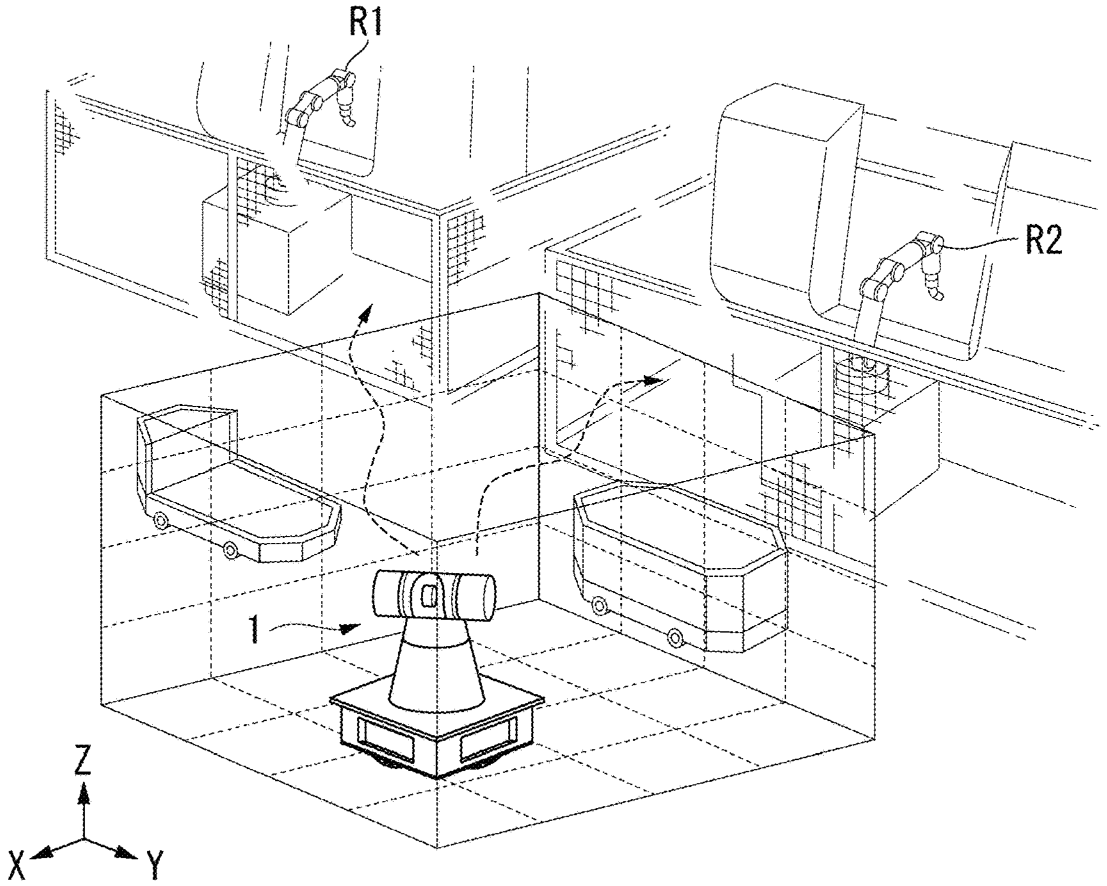
FIG. 1 is a diagram showing an example of a state in which a movable position measurement device according to a first embodiment moves in a factory.

Hereinafter, a first embodiment will be described in detail with reference to the drawings. FIG. 1 is a diagram showing an example of a state in which a movable position measurement device 1 according to the present embodiment moves in a factory. The movable position measurement device 1 can be moved freely in the factory. The movable position measurement device 1 is a device for measuring a position of a measurement target such as a machine tool or a robot arranged in the factory with high accuracy and can automatically calibrate the position of the machine tool or robot with high accuracy according to a measurement result.

The movable position measurement device 1 irradiates measurement light to a reflective element 4 arranged in a movable unit of the measurement target and receives reflected light. The movable position measurement device 1 measures position information on the basis of a light reception result. The position information is information indicating the position of the reflective element 4 with respect to a reference position. The reference position is a predetermined position in a space where the reflective element 4 is arranged.

The position information is indicated by the coordinates of a coordinate system (referred to as a reference coordinate system) in the space where the reflective element 4 is arranged. The position information is indicated by, for example, Cartesian coordinates (X, Y, Z) shown in FIG. 1. A set of coordinates X, Y, and Z indicates a position in Cartesian coordinates (X, Y, Z). In addition, the coordinates X, Y, and Z may be referred to as a distance in an X-direction, a distance in a Y-direction, and a distance in a Z-direction, respectively. In the Cartesian coordinates of FIG. 1, an angular component in a rotation direction about an X-axis, an angular component in a rotation direction about a Y-axis, and an angular component in a rotation direction about a Z-axis may each be referred to as information about the position. Also, when the position is indicated by spherical coordinates, the angular component of the spherical coordinates may be referred to as information about the position. Also, when the position is indicated by cylindrical coordinates, the angular component of the cylindrical coordinates may be referred to as information about the position. In addition, in FIG. 1, the coordinate system around the movable position measurement device 1 is also illustrated.

The movable position measurement device 1 transmits the measured position information to a control system of the machine tool or robot. The reference position and the coordinate system are shared in advance between the movable position measurement device 1 and the control system. Because the control system can acquire the position of the machine tool or robot on the basis of the position information received from the movable position measurement device 1, the machine tool or the robot can be calibrated with high accuracy.

As described above, the movable position measurement device 1 measures the position of the reflective element 4 arranged in a predetermined part such as the movable unit among parts constituting the measurement target such as the machine tool or the robot. Therefore, a position of the measurement target is a position of the predetermined part among the parts constituting the measurement target. The predetermined part is predetermined for the entire part constituting the measurement target. Therefore, the control system can acquire the position of the predetermined part among the parts constituting the measurement target on the basis of the position information received from the movable position measurement device 1 and calibrate the measurement target with high accuracy on the basis of the position of the predetermined part. In addition, the predetermined part of the parts constituting the measurement target may be a part whose position in the coordinate system changes, in other words, a moving part.

The control system calculates a correction value for automated calibration on the basis of the position of the predetermined part. The control system controls a control target on the basis of the calculated correction value. That is, the control system calculates a correction value for automated calibration on the basis of a measurement result of the movable position measurement device 1 and performs a control process based on a result of calculating the correction value.

The calculation of the correction value for the automated calibration based on the measurement result of the movable position measurement device 1 and the control process based on the result of calculating the correction value may be performed by a host computer that controls the measurement target such as the movable position measurement device 1, the robot, or the machine tool.

The movable position measurement device 1 irradiates measurement light to a reflective element arranged in the movable unit of the measurement target and receives reflected light. First, the movable position measurement device 1 calculates distance information on the basis of the light reception result. The distance information is information indicating a distance from the movable position measurement device 1 to the reflective element 4.

The movable position measurement device 1 calculates direction information on the basis of an irradiation direction of the measurement light. The direction information is information indicating a direction of the reflective element 4 for the reference direction. The reference direction is, for example, a direction in which the reference position is viewed from the movable position measurement device 1. The direction information is indicated by a pair of an angle in a latitudinal direction and an angle in a longitudinal direction (i.e., the angular component of spherical coordinates).

The movable position measurement device 1 calculates a relative position of the reflective element 4 for the movable position measurement device 1 on the basis of the calculated distance information and the calculated direction information. The movable position measurement device 1 calculates the position of the reflective element 4 for the reference position (i.e., the position of the reflective element 4 in the reference coordinate system) as position information on the basis of a position of the movable position measurement device 1 for the reference position and a position of the reflective element 4 relative to the movable position measurement device 1.

The position of the movable position measurement device 1 for the reference position is, in other words, a position of the movable position measurement device 1 in a coordinate system set in the space where the reflective element 4 is arranged. In addition, in the present embodiment, the position of the movable position measurement device 1 for the reference position may be acquired in advance before the measurement is started, may be acquired after the measurement is started (during measurement), or may be acquired after the measurement is completed (after the measurement).

The position of the movable position measurement device 1 for the reference position is acquired, for example, from the control system. The position may be measured by the movable position measurement device 1 itself. A method of measuring the position of the movable position measurement device 1 for the reference position (calibration of the origin) will be described in subsequent embodiments.

Also, in the present embodiment, it is assumed that a positional relationship between the movable position measurement device 1 and the reference position does not change. Alternatively, in the present embodiment, even if the positional relationship between the movable position measurement device 1 and the reference position changes, a measurement result is not corrected. A case where the positional relationship between the movable position measurement device 1 and the reference position changes will be described in the subsequent embodiments.

In addition, the position information may be indicated by spherical coordinates or cylindrical coordinates or may be indicated by another Cartesian coordinate system. The Cartesian coordinate system is a general term for a coordinate system in which unit vectors are orthogonal.

The position is a physical quantity indicating where a physical object is located in the space. The distance is a physical quantity indicating a length measured between two points in the space. The distance is, for example, a Euclidean distance.

Figure 2:
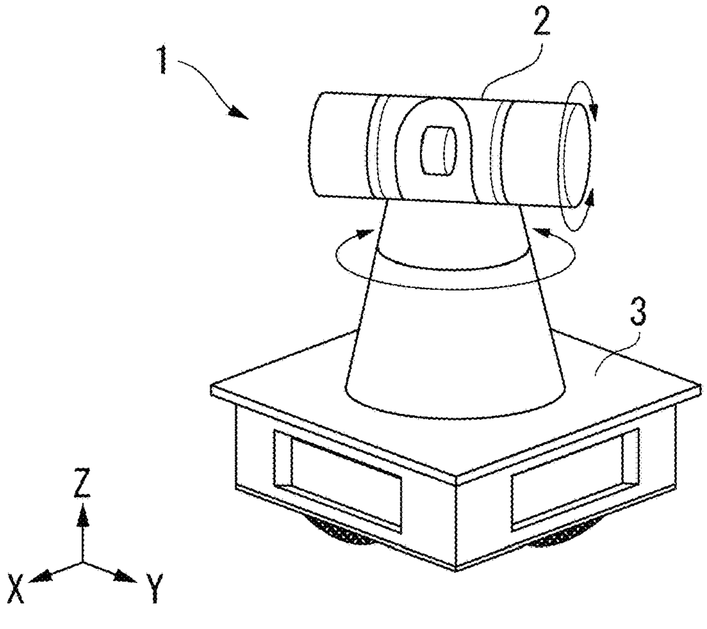
FIG. 2 is a diagram showing an example of the appearance of the movable position measurement device according to the first embodiment.

FIG. 2 is a diagram showing an example of the appearance of the movable position measurement device 1 according to the present embodiment. The movable position measurement device 1 includes a position measurement device 2 and a movement device 3.

Figure 3:
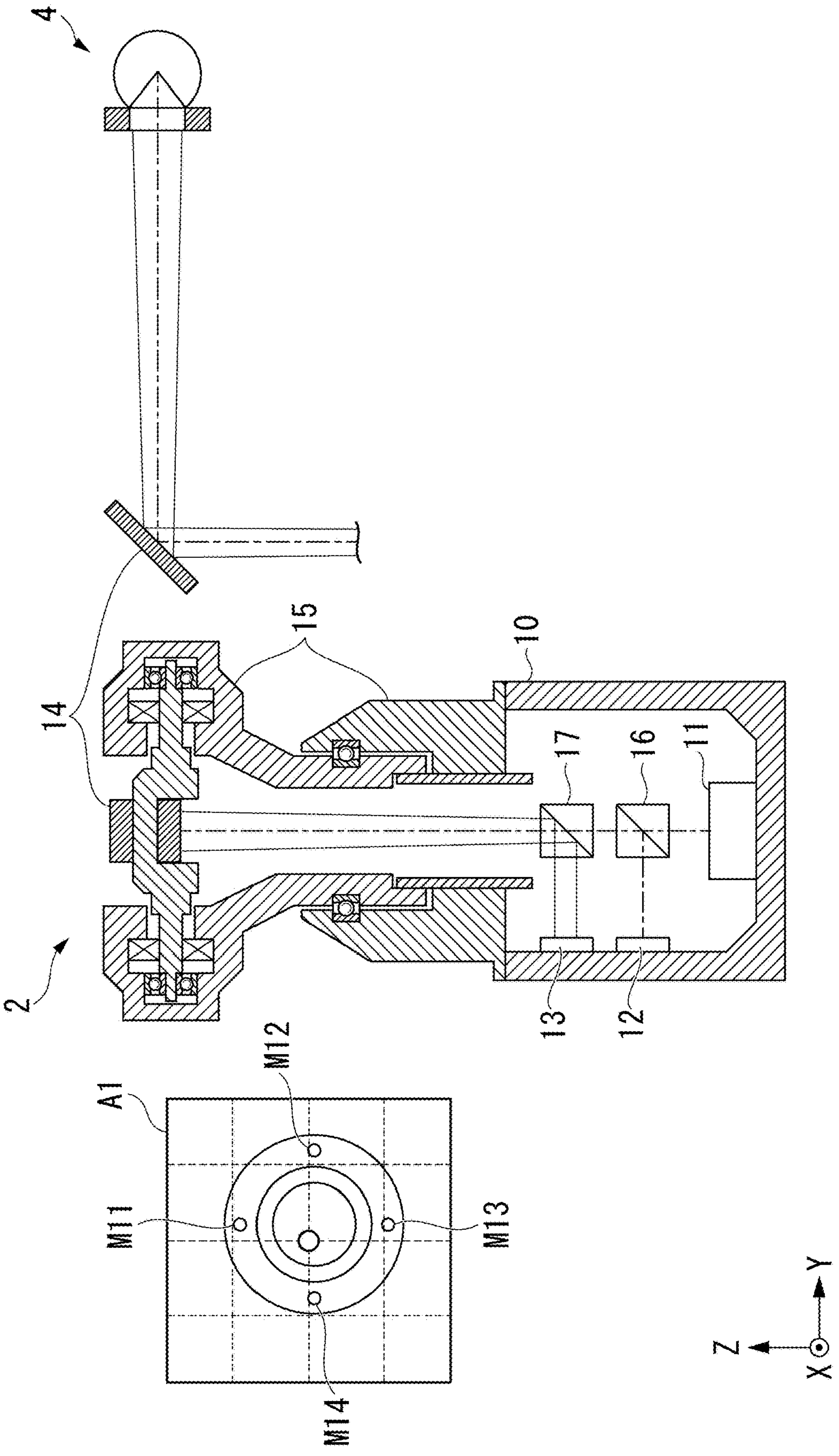
FIG. 3 is a diagram showing an example of a configuration of a position measurement device according to the first embodiment.
Figure 6:
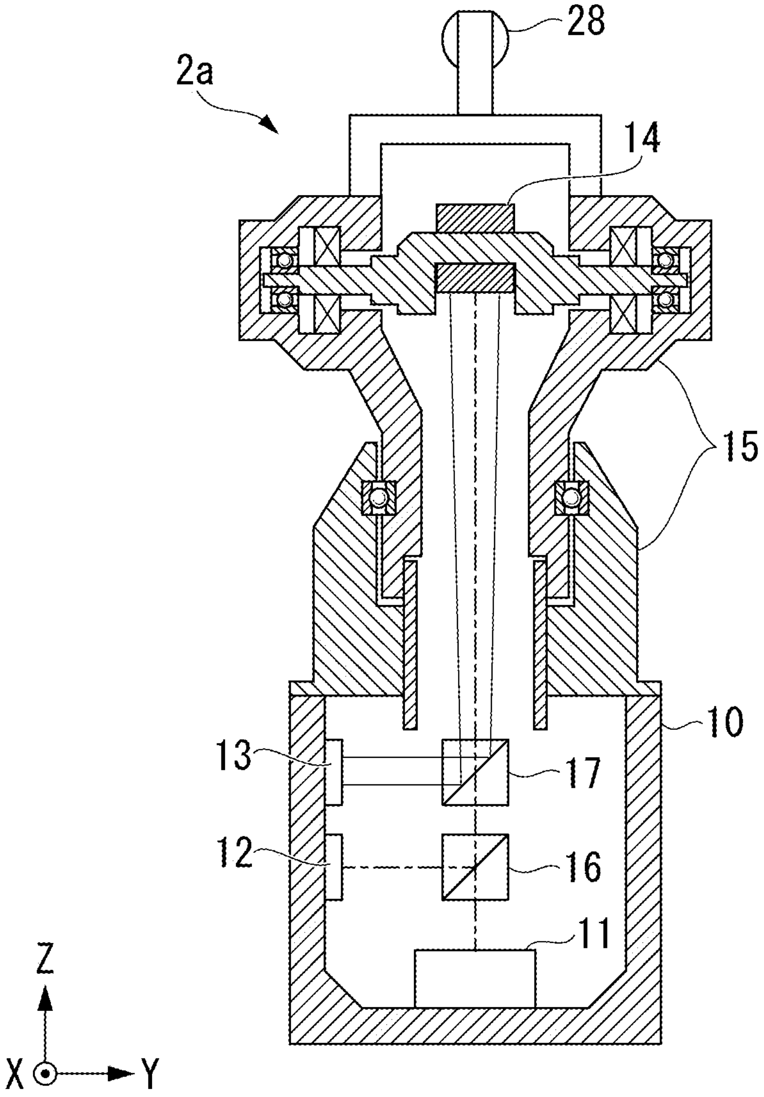
FIG. 6 is a diagram showing an example of a configuration of a position measurement device according to a second embodiment.

In FIGS. 2, 3, and 6, an XYZ Cartesian coordinate system, which is a three-dimensional Cartesian coordinate system, is shown for convenience of description. In the XYZ Cartesian coordinate system, the direction of the Z-axis is vertically upward. In the following description, a direction parallel to the Z-axis is also referred to as an upward/downward direction. The direction of the Z-axis is also referred to as the upward direction. A direction opposite to the direction of the Z-axis is also referred to as the downward direction. A positive side in the Z-axis direction is also referred to as an upper side and a negative side in the Z-axis direction is also referred to as a lower side. A direction parallel to the X-axis is also referred to as a depth direction. A positive side in the X-axis direction is also referred to as a front side and a negative side in the X-axis direction is also referred to as a back side. A direction parallel to the Y-axis is also referred to as a left/right direction. A positive side in the Y-axis direction is also referred to as a right side and a negative side in the Y-axis direction is also referred to as a left side.

The position measurement device 2 is placed in the movement device 3. The movement device 3 is movable. Thereby, the position measurement device 2 is conveyed by the movement device 3. The movement device 3 includes wheels, a caterpillar, and the like, and runs automatically. Thereby, the movement device 3 can move freely in the factory. The movement device 3 is, as an example, an unmanned conveyance vehicle (an automatic guided vehicle (AGV) or an autonomous mobile robot (AMR)). In addition, the AGV and the AMR are referred to as unmanned conveyance robots.

In addition, the movement device 3 may be a conveyance machine other than an AGV as long as it can be moved with the position measurement device 2 placed thereon. Also, the movement device 3 may be configured to move in a predetermined range or along a predetermined course in the factory. For example, the movement device 3 may move along a rail or the like provided in the factory.

Also, the position measurement device 2 may be placed on a floor or the like and used as a single unit in a state in which it is detached from the movement device 3.

Next, a configuration of the position measurement device 2 will be described. FIG. 3 is a diagram showing an example of the configuration of the position measurement device 2 according to the present embodiment. The position measurement device 2 includes a housing 10, an optical frequency comb interferometer 11, a four-division position sensitive detector (PSD) 12, a coaxial camera 13, a beam steering mirror 14, a pointing mirror assembly (PMA) 15, a first half mirror 16, and a second half mirror 17.

The housing 10 is a member for installing a main body of the position measurement device 2 on an installation target. When the position measurement device 2 is installed on the installation target, the housing 10 is located on the installation target. In the present embodiment, the installation target is the movement device 3. In the present embodiment, the housing 10 is placed on the movement device 3, such that the position measurement device 2 is transported by the movement device 3. In addition, the installation target may be a factory floor or the like.

The housing 10, for example, fixes the position measurement device 2 on the installation target according to its own load. In addition, the housing 10 may include a mechanism for fixing the position measurement device 2 on the installation target.

Also, each component of the position measurement device 2 is provided in the housing 10. Each component of the position measurement device 2 is attached to the housing 10. The beam steering mirror 14 and the PMA 15 are attached to the outer side of the housing 10. Inside of the housing 10, the optical frequency comb interferometer 11, the four-division PSD 12, the coaxial camera 13, the first half mirror 16, and the second half mirror 17 are provided. Also, the housing 10 has a space for propagating measurement light and reflected light inside thereof.

The optical frequency comb interferometer 11 measures a distance from the optical frequency comb interferometer 11 to the measurement target. The optical frequency comb interferometer 11 includes an optical frequency comb light source. The optical frequency comb light source is a light source capable of generating light including frequency components evenly spaced on the frequency axis (hereinafter referred to as an "optical frequency comb") as pulsed light. In this case, the optical frequency comb light source outputs pulsed light including frequency components evenly spaced on the frequency axis as measurement light. The optical frequency comb interferometer 11 irradiates light of an optical frequency comb as measurement light to the reflective element 4 arranged at the measurement target. The optical frequency comb interferometer 11 receives reflected light generated by reflecting the light of the optical frequency comb in the reflective element 4.

In the present embodiment, the optical frequency comb interferometer 11 includes a single measurement light source (i.e., an optical frequency comb light source). In addition, the optical frequency comb interferometer 11 may include a plurality of measurement light sources, for example, a first measurement light source and a second measurement light source. The plurality of measurement light sources output a plurality of measurement light beams that are phase-synchronous and coherent. For example, the plurality of measurement light sources may have different oscillation frequencies. For this reason, the plurality of measurement light beams output by the plurality of measurement light sources are a plurality of measurement light beams each having a different pulse frequency (for example, the different number of pulsed light beams per unit time and a different reciprocal of a light emission period of pulsed light). As an example, the first measurement light source may output first measurement light having a pulse frequency of 25 GHz and the second measurement light source may output second measurement light having a pulse frequency of 25 GHz+$\alpha$ (for example, +100 kHz).

In the distance measurement using the optical frequency comb interferometer 11, a distance from the optical frequency comb interferometer 11 to the reflective element 4 is measured on the basis of a position at which interference fringes are generated between the different pulses of the optical frequency comb. The optical frequency comb interferometer 11, for example, can measure the distance with accuracy on the order of sub-micrometers.

The optical frequency comb interferometer 11 includes an irradiation unit, a light reception unit, and a signal processing unit. The irradiation unit includes an optical frequency comb light source, a frequency control unit, and the like. The irradiation unit irradiates pulsed light generated by the optical frequency comb light source as measurement light to the measurement target. Also, the irradiation unit branches a part of the pulsed light generated by the optical frequency comb light source and irradiates light to a reference surface in the optical frequency comb interferometer 11 as reference light. The light reception unit includes a photodetector. The photodetector detects interference light between the reflected light and the reference light irradiated to the reference surface. When a detection result of the photodetector is input, the signal processing unit calculates a distance from the optical frequency comb interferometer 11 to the reflective element 4 on the basis of a position at which the pulsed light for creating interference light between the reflected light and the reference light is generated.

Here, the principle by which the optical frequency comb interferometer 11 calculates the distance from the optical frequency comb interferometer 11 to the reflective element 4 will be described in more detail.

The optical frequency comb interferometer 11 includes two optical frequency comb light sources, i.e., a first optical frequency comb light source and a second optical frequency comb light source, as optical frequency comb light sources. The optical frequency comb interferometer 11 includes two photodetectors, i.e., a first photodetector and a second photodetector, as photodetectors.

The first optical frequency comb light source generates the first measurement light that is pulsed light having a first pulse frequency as the measurement light. The second optical frequency comb light source generates the second measurement light that is pulsed light having a second pulse frequency as the measurement light. The first pulse frequency and the second pulse frequency are different frequencies from each other.

When the first measurement light is output from the first optical frequency comb light source, it is not irradiated to the measurement target (i.e., the reflective element 4), but is reflected by the optical system in the first optical frequency comb light source and then input as the first reflected light to the first photodetector. On the other hand, the second measurement light is irradiated from the second optical frequency comb light source to the measurement target (i.e., the reflective element 4), reflected on the measurement target, and then input to the second photodetector as the second reflected light.

A part of the first measurement light is branched and irradiated as the first reference light to the reference surface in the optical frequency comb interferometer 11, and then input to the second photodetector. On the other hand, a part of the second measurement light is branched and irradiated as the second reference light to the reference surface in the optical frequency comb interferometer 11, and then input to the first photodetector.

Because a pulse frequency of the first measurement light and a pulse frequency of the second measurement light are different, a pulse frequency of the first reflected light and a pulse frequency of the second reference light are different. Therefore, interference light between the first reflected light and the second reference light becomes interference light in which pulsed light appears in synchronization with a timing at which pulsed light constituting the first reflected light and pulsed light constituting the second reference light are simultaneously input to the first photodetector.

Likewise, the pulse frequency of the first reference light and the pulse frequency of the second reflected light are different. Therefore, the interference light between the first reference light and the second reflected light becomes interference light in which pulsed light appears in synchronization with a timing at which pulsed light constituting the first reference light and pulsed light constituting the second reflected light are simultaneously input to the second photodetector.

Here, the position of the pulsed light (the position on the time axis) for creating the interference light detected by the second photodetector changes on the basis of a positional relationship between the optical frequency comb interferometer 11 and the measurement target. This is because the interference light detected by the second photodetector is interference light between the second reflected light directed to the second photodetector via the measurement target and the first reference light directed to the second photodetector without involving the measurement target. On the other hand, the position of the pulsed light (the position on the time axis) for creating the interference light detected by the first photodetector does not change on the basis of the positional relationship between the optical frequency comb interferometer 11 and the measurement target.

For this reason, a time difference between the pulsed light for creating the interference light detected by the second photodetector and the pulsed light for creating the interference light detected by the first photodetector indirectly indicates a positional relationship between the optical frequency comb interferometer 11 and the measurement target (typically, a distance between the optical frequency comb interferometer 11 and the measurement target). Therefore, the optical frequency comb interferometer 11 can calculate the distance from the optical frequency comb interferometer 11 to the reflective element 4 on the basis of a time difference between the pulsed light for creating the interference light detected by the second photodetector and the pulsed light for creating the interference light detected by the first photodetector.

Here, the measurement light irradiated by the optical frequency comb interferometer 11 is reflected by the beam steering mirror 14 and irradiated to the reflective element 4 after being transmitted through the first half mirror 16 and the second half mirror 17. Here, an optical path of the measurement light irradiated to the reflective element 4 is partially identical to that of the reflected light reflected by the reflective element 4.

The first half mirror 16 transmits the measurement light irradiated from the optical frequency comb interferometer 11. Also, the first half mirror 16 transmits a part of the reflected light obtained by reflecting the measurement light in the reflective element 4 toward the optical frequency comb interferometer 11 and reflects the remaining part toward the four-division PSD 12.

The second half mirror 17 transmits the measurement light irradiated from the optical frequency comb interferometer 11. Also, the second half mirror 17 transmits a part of the reflected light obtained by reflecting the measurement light in the reflective element 4 toward the optical frequency comb interferometer 11. The remaining part is reflected toward the four-division PSD 12. Also, the second half mirror 17 reflects reflected light obtained by reflecting natural light (or light output by the LED) from the reflective element 4 toward the coaxial camera 13 side and the coaxial camera 13 images the reflected light obtained by reflecting natural light (or light output by the LED) from the reflective element 4.

The coaxial camera 13 captures an image of the reflective element 4, which is a measurement target. The coaxial camera 13 captures an image of the reflective element 4 according to reflected light obtained by reflecting natural light or artificial light of a light bulb, a fluorescent lamp, a mercury lamp, an LED, or a strobe in the reflective element 4.

The coaxial camera 13 is used to track the position of the reflective element 4. When the coaxial camera 13 captures an image of the reflective element 4, the position measurement device 2 roughly captures the position of the reflective element 4 and roughly adjusts a direction in which the measurement light is irradiated. Here, if the accuracy of measurement of the position of the reflective element 4 or adjustment of the irradiation direction is lower, it indicates that the accuracy is lower than that of the case where the four-division PSD 12 is used, as will be described below.

An image A1 is an example of an image of the reflective element 4 imaged by the coaxial camera 13.

The term "coaxial" in "coaxial camera 13" may indicate that a part of the optical system of the coaxial camera 13 is identical to a part of the optical system of the optical frequency comb interferometer 11 or/and a part of the optical system of the four-division PSD 12 or, for example, may indicate that the optical system of the coaxial camera 13 and a part of the optical system of the optical frequency comb interferometer 11 or a part of the optical system of the four-division PSD 12 share the same optical component. Also, the term "coaxial" in "coaxial camera 13" includes a case where there is a positional relationship in which a part of the optical path of the coaxial camera 13 is close to a part of the optical path of the optical frequency comb interferometer 11 or/and a part of the optical path of the four-division PSD 12 (or includes a case where it passes through optical paths that are not completely identical to each other). As an example of optical paths that are not completely identical to each other, the case where there is a positional relationship in which a partial optical path of the coaxial camera 13 is close to a partial optical path of the optical frequency comb interferometer 11 or/and a partial optical path of the four-division PSD 12, but the optical paths slightly deviate is included and this case may be referred to as a slightly shifted relationship, a slightly tilted relationship, or the like.

The four-division PSD 12 measures the position of the reflective element 4 by detecting the reflected light from the reflective element 4. The reflected light is reflected light obtained by reflecting the measurement light irradiated by the optical frequency comb interferometer 11 in the reflective element 4. The reflected light is partially reflected by the first half mirror 16 and input to the four-division PSD 12.

The four-division PSD 12 includes, for example, photodiodes and a resistor. The photodiodes are arranged in an array shape. That is, the four-division PSD 12 includes a photodiode array. A detection surface of the four-division PSD 12 is divided into four detection surfaces. The four-division PSD 12 measures a position of spot light on the basis of an amount of spot light of the reflected light detected at each of the four division detection surfaces.

The four-division PSD 12 is used to finely adjust an irradiation direction of the measurement light after the position of the reflective element 4 is roughly captured by the coaxial camera 13. Here, the accuracy of the position of the reflective element 4 identified on the basis of an image of the reflective element 4 imaged by the coaxial camera 13 is lower than the accuracy of the position of the reflective element 4 measured by the four-division PSD 12. Therefore, the accuracy of the adjustment of the irradiation direction of the measurement light based on the position of the reflective element 4 identified on the basis of the image of the reflective element 4 imaged by the coaxial camera 13 is lower than the accuracy of the adjustment of the irradiation direction of the measurement light based on the position of the reflective element 4 measured by the four-division PSD 12.

In addition, the position measurement device 2 may include another position detector instead of the four-division PSD 12. Other position detectors include, for example, a line sensor, a two-dimensional sensor (also referred to as an area sensor), and a distance measurement instrument of a phase detection scheme.

The beam steering mirror 14 reflects the measurement light irradiated from the optical frequency comb interferometer 11 in the direction of the reflective element 4. Also, the beam steering mirror 14 reflects the reflected light obtained by reflecting the measurement light from the reflective element 4 in the direction of the optical frequency comb interferometer 11.

The PMA 15 moves (changes) the direction of the beam steering mirror 14. As an example, the PMA 15 includes a gimbal unit and a rotary encoder (not shown). The direction of the beam steering mirror 14 is changed by driving the gimbal unit and changing a rotation angle of the gimbal unit. The gimbal unit can be rotated so that the beam steering mirror 14 can be changed in a longitudinal direction and a latitudinal direction. The rotary encoder measures the rotation angle of the gimbal unit.

The first imaging unit 23 includes a coaxial camera 13 and the meaning of "coaxial" in "coaxial camera 13" is as described above. In the present embodiment, as an example, the optical path of the reflected light used for imaging by the coaxial camera 13 described above is partially identical to the optical path of the measurement light or reflected light used for distance measurement by the optical frequency comb interferometer 11 described above. That is, at least a partial optical path of an optical system for imaging by the first imaging unit 23 is identical to at least a part of the optical path of an optical system for light reception by the light reception unit provided in the optical frequency comb interferometer 11.

The imaging direction of the coaxial camera 13 is changed by changing the direction of the beam steering mirror 14 that changes the direction of the measurement light irradiated by the optical frequency comb interferometer 11. That is, the beam steering mirror 14 is commonly used for changing the irradiation direction of the measurement light irradiated by the optical frequency comb interferometer 11 and changing the imaging direction of the coaxial camera 13.

In addition, the position measurement device 2 may include a camera outside of the housing 10 instead of the coaxial camera 13. In the camera, the optical path of the reflected light used for imaging is not identical to the optical path of the measurement light or the reflected light used for the distance measurement by the optical frequency comb interferometer 11 described above. Also, in this case, a drive mechanism for changing the imaging direction of the camera is provided.

The reflective element 4 is arranged in the measurement target. The reflective element 4 is arranged in the movable unit of the measurement target, such as a machine tool or robot. The reflective element 4 is, as an example, a retroreflector. The retroreflector is an optical element that reflects a beam in an input direction, regardless of an input position or direction of the beam in the retroreflector. That is, the retroreflector has a retroreflective function.

Although an example in which the coaxial camera 13 captures the image of the reflective element 4 and the position of the reflective element 4 is identified will be described in the present embodiment, the present invention is not limited thereto. For example, the coaxial camera 13 may identify the position of the reflective element 4 by imaging a mark or the like installed in a predetermined part of the reflective element 4 and analyzing an image of an imaging result.

For example, in an image A1 of FIG. 3, a plurality of marks (marks M11, M12, M13, and M14) are imaged on the outer periphery of the reflective element 4. The coaxial camera 13 may identify the position or/and posture of the reflective element 4 by imaging the plurality of marks (the marks M11, M12, M13, and M14). The plurality of marks are, for example, members that can be fitted to the outer periphery of the reflective element 4. The plurality of marks may be seals. The plurality of marks may be arranged on the reflective element 4 by coating the surface of the reflective element 4.

Also, the plurality of marks (the marks M11, M12, M13, and M14) arranged in a predetermined part of the reflective element 4 shown in FIG. 3 may be light-emitting diodes (LEDs). When the plurality of marks arranged in the predetermined part of the reflective element 4 are LEDs, the accuracy of recognition based on image analysis can be improved by flashing and lighting up. In this case, the light used in the imaging process of the coaxial camera 13 becomes emitted light instead of the reflected light in which the natural light is reflected by the reflective element 4.

When a plurality of reflective elements 4 are provided, each of the plurality of reflective elements 4 may be identified by changing the color and flashing cycle of the LED for the reflective element 4.

As another example of the method in which the coaxial camera 13 tracks (identifies) the position of the reflective element 4, the coaxial camera 13 may image a feature point arranged at a predetermined position from the position of the reflective element 4 and identify a position of the reflective element 4 from a position of the feature point. The feature point is, for example, a pattern in which a two-dimensional code is drawn. When the coaxial camera 13 images the feature point, the coaxial camera 13 recognizes the feature point on the basis of image recognition and identifies a position of the feature point. The coaxial camera 13 identifies the position of the reflective element 4 on the basis of the identified position.

Also, the coaxial camera 13 may identify the position of the reflective element 4 by imaging a known feature point on the appearance of a part of the robot arm or a part of the machine tool.

As described above, the position measurement device 2 is placed in the movement device 3. Therefore, the irradiation unit and the light reception unit provided in the optical frequency comb interferometer 11 provided in the position measurement device 2, the gimbal unit provided in the PMA 15, and the coaxial camera 13 are moved by the movement device 3. Also, at least a part of the irradiation part provided in the optical frequency comb interferometer 11, at least a part of the light reception unit provided in the optical frequency comb interferometer 11, at least a part of the gimbal unit provided in the PMA 15, and at least a part of the coaxial camera 13 may not be placed in the movement device 3. That is, the movement device 3 may move at least one of the irradiation unit provided in the optical frequency comb interferometer 11, the light reception unit provided in the optical frequency comb interferometer 11, the gimbal unit provided in the PMA 15, and the coaxial camera 13. In addition, the irradiation unit and/or the light reception unit provided in the optical frequency comb interferometer 11 may not be moved by the movement device 3. In this case, the irradiation unit and/or the light reception unit may be connected with the optical path of the measurement light and/or the reflected light in the housing 10 through an optical transmission member such as an optical fiber.

The irradiation unit provided in the optical frequency comb interferometer 11 is provided in the movement device 3 and irradiates measurement light to the reflective element 4.

The light reception unit provided in the optical frequency comb interferometer 11 is provided in the movement device 3 and receives the reflected light of the measurement light from the reflective element 4.

The signal processing unit provided in the optical frequency comb interferometer 11 acquires position information about the reflective element 4 on the basis of a light reception result of the light reception unit provided in the optical frequency comb interferometer 11. In addition, the signal processing unit provided in the optical frequency comb interferometer 11 may acquire distance information.

Figure 4:
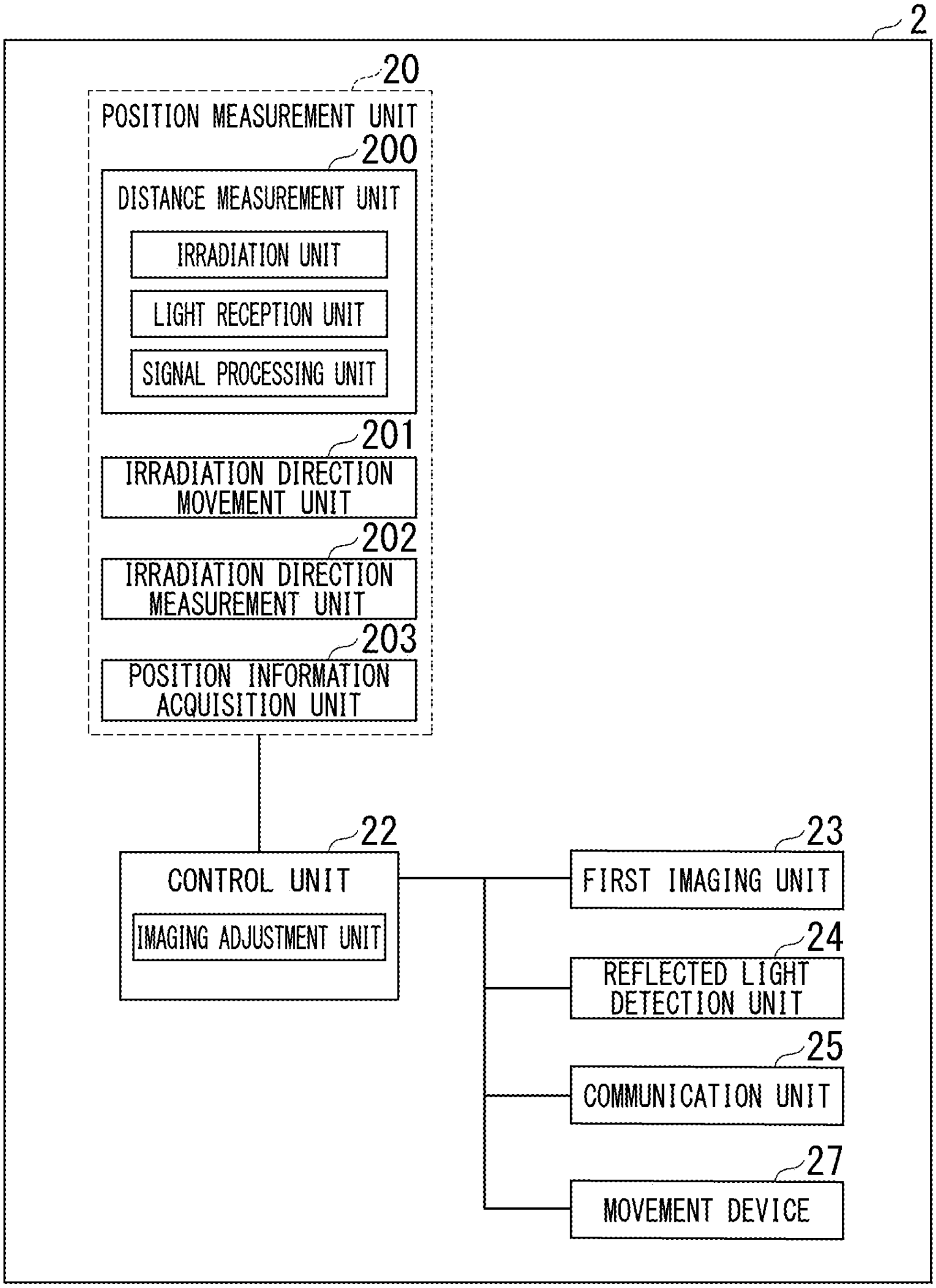
FIG. 4 is a diagram showing an example of a functional configuration of the position measurement device according to the first embodiment.

FIG. 4 is a diagram showing an example of a functional configuration of the position measurement device 2 according to the present embodiment. The position measurement device 2 includes a position measurement unit 20, a control unit 22, a first imaging unit 23, a reflected light detection unit 24, a communication unit 25, and a movement device 27.

The position measurement unit 20 includes a distance measurement unit 200, an irradiation direction movement unit 201, an irradiation direction measurement unit 202, and a position information acquisition unit 203.

The distance measurement unit 200 irradiates measurement light to the reflective element 4, receives reflected light, and measures a distance to the reflective element. The distance measurement unit 200 includes an irradiation unit, a light reception unit, and a signal processing unit. The irradiation unit irradiates the measurement light to the reflective element arranged in the movable unit of the measurement target. The light reception unit receives the reflected light. The signal processing unit processes a signal from the light reception unit and acquires information of the distance to the reflective element 4. The distance measurement unit 200 includes the optical frequency comb interferometer 11. The irradiation unit includes an optical frequency comb light source provided in the optical frequency comb interferometer 11. The light reception unit includes a light reception unit provided in the optical frequency comb interferometer 11. The signal processing unit includes a signal processing unit provided in the optical frequency comb interferometer 11.

The irradiation direction movement unit 201 changes the irradiation direction of the measurement light. Changing the irradiation direction is also referred to as moving the irradiation direction. The irradiation direction movement unit 201 includes a gimbal unit included in the PMA 15.

Here, in the present embodiment, as described above, the beam steering mirror 14 is commonly used for changing the irradiation direction of the measurement light irradiated by the optical frequency comb interferometer 11 and changing the imaging direction of the coaxial camera 13. The irradiation direction movement unit 201 includes an imaging adjustment unit configured to adjust the imaging direction of the first imaging unit 23. The imaging adjustment unit adjusts the imaging direction of the first imaging unit 23.

The irradiation direction measurement unit 202 measures the irradiation direction of the measurement light. The irradiation direction measurement unit 202 includes a rotary encoder included in the PMA 15 and configured to measure the angle of the gimbal unit. The irradiation direction measurement unit 202 outputs a result of measuring the irradiation direction to the position information acquisition unit 203 of the distance measurement unit 200 as direction information.

The position information acquisition unit 203 acquires the position (position information) in the three-dimensional space of the reflective element 4 from the distance to the reflective element 4 (distance information) measured by the distance measurement unit 200 and the irradiation direction (direction information) of the measurement light measured by the irradiation direction measurement unit 202. Details of the acquisition of the position information will be described below.

The control unit 22 controls other devices and components provided in the position measurement device 2. The control unit 22 includes, for example, a central processing unit (CPU), a graphics processing unit (GPU), a field-programmable gate array (FPGA), and the like, and performs various types of calculation and information exchange. The control unit 22 reads a program from the ROM and executes various types of control in accordance with the read program.

In addition, the control unit 22 and the devices and components provided in the position measurement device 2 are connected, for example, by signal lines. In addition, the control unit 22 may communicate with the devices and components provided in the position measurement device 2 through short-range wireless communication using electromagnetic waves such as light and radio waves.

The control unit 22 executes various types of calculation. Also, the control unit 22 includes an imaging adjustment unit.

The first imaging unit 23 captures an image of the reflective element 4. The first imaging unit 23 includes the coaxial camera 13.

The reflected light detection unit 24 detects the reflected light from the reflective element 4. The reflected light detection unit 24 includes a four-division PSD 12.

The communication unit 25 communicates with an external device. The external device is, for example, a control system that controls a robot on which the reflective element 4 is installed. The communication unit 25 includes a transmission unit and a reception unit. The transmission unit transmits the position information of the reflective element 4 acquired by the position information acquisition unit included in the distance measurement unit 200 to the control system. The communication unit 25 includes a communication interface (I/F) for performing communication via a wireless network.

In a communication process of the communication unit 25, for example, a fifth-generation mobile communication system or a mobile communication system using light having a wavelength shorter than that of millimeter waves may be used. In the fifth-generation mobile communication system, a frequency band of 450 MHz to 6000 MHz and a frequency band of 24250 MHz to 52600 MHz are used as frequency bands.

The movement device 27 is movable. The movement device 27 includes the movement device 3. That is, the movement device 27 includes, for example, an AGV and an AMR.

Figure 5:
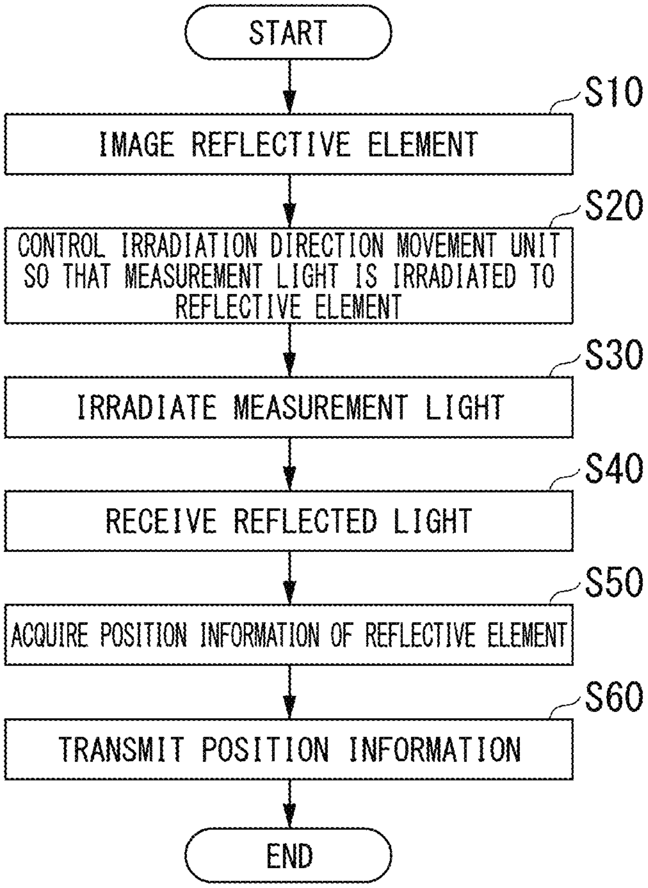
FIG. 5 is a diagram showing an example of a position measurement process according to the first embodiment.

Next, a position measurement process of the movable position measurement device 1 will be described with reference to FIG. 5. FIG. 5 is a diagram showing an example of the position measurement process according to the present embodiment. The position measurement process is executed by the control unit 22.

The control unit 22 captures an image of the reflective element 4 using the first imaging unit 23 (step S10). In addition, the control unit 22 may use the first imaging unit 23 to image one or both of at least a part of the robot, which is the measurement target, and the reflective element 4.

Here, the imaging adjustment unit provided in the control unit 22 adjusts an imaging direction of the first imaging unit 23 so that the reflective element 4 is included in an imaging range of the first imaging unit 23. The imaging direction is, for example, a direction in which an optical axis of an imaging lens is directed. When the optical path for imaging is bent by the beam steering mirror 14, the optical axis of the imaging lens may include a bent optical axis. In adjusting the imaging direction of the first imaging unit 23, the imaging adjustment unit may cause a direction in which the optical axis of the imaging lens is directed to overlap the reflective element 4 or it is only necessary to include the reflective element 4 in the imaging range even if the direction does not overlap the reflective element 4. On the basis of the image that is the imaging result of the first imaging unit 23, the imaging adjustment unit determines whether or not the reflective element 4 is included in the imaging range of the first imaging unit 23. The imaging adjustment unit has an image analysis function and discriminates the image of the reflective element 4 by analyzing the image of the imaging result of the first imaging unit 23. The imaging adjustment unit discriminates the image of the reflective element 4 on the basis of, for example, pattern matching. In addition, the irradiation direction movement unit 201 may learn the image of the reflective element 4 with A1 (machine learning) in advance and discriminate the image of the reflective element 4 on the basis of a learning result. Also, immediately after the reflective element 4 is detected in pattern matching, the imaging adjustment unit may discriminate a position of the image of the reflective element 4 by discriminating feature information (color information or/and luminance information of pixels) of a pixel region discriminated from the reflective element 4 from a captured image at a timing at which the reflective element 4 is detected or immediately after or before the timing and searching for similar feature information (color information or/and luminance information of pixels) in a subsequent frame.

In addition, in the imaging direction of the first imaging unit 23, a position where the movable position measurement device 1 is installed so that the reflective element 4 is included in the imaging range of the first imaging unit 23, and/or the direction of the housing 10 may be adjusted in advance. In this case, the imaging adjustment unit may be omitted from the configuration of the control unit 22.

The control unit 22 controls the irradiation direction movement unit 201 so that the measurement light is irradiated to the reflective element 4 on the basis of the imaging result of the first imaging unit 23 (step S20). The irradiation direction movement unit 201 changes the direction of the beam steering mirror 14 while using the measurement result of the irradiation direction by the rotary encoder. The irradiation direction movement unit 201 changes the direction of the beam steering mirror 14 in the longitudinal direction and/or the latitudinal direction via the gimbal unit. That is, the irradiation direction movement unit 201 moves in the irradiation direction in accordance with an instruction of the control unit 22 so that the measurement light is irradiated to the reflective element 4 serving as the measurement target discriminated on the basis of the imaging result of the first imaging unit 23.

The latitudinal direction is a direction indicated by an angle formed by a first predetermined axis (the Z-axis in the example shown in FIG. 3) and a moving radius in a spherical coordinate system. The longitudinal direction is a direction indicated by an angle formed by a second predetermined axis (the X-axis in the example shown in FIG. 3) contained in a plane perpendicular to the predetermined axis and the projection of a moving radius to the plane.

Here, further, the control unit 22 controls the irradiation direction movement unit 201 so that the measurement light tracks the movement of the reflective element 4 serving as the measurement target on the basis of the imaging result of the first imaging unit 23. Because the irradiation direction movement unit 201 is driven so that the measurement light tracks the reflective element 4, the measurement light can be continuously irradiated to the reflective element 4 even if the reflective element 4 moves and the first imaging unit 23 can continuously image the reflective element 4.

Also, when the measurement target is changed, the position of the measurement target after the change can be identified by imaging the reflective element 4 installed on the measurement target after the change. For example, when the measurement target is changed from a robot R1 to a robot R2 in FIG. 1, the first imaging unit 23 changes an imaging target from the reflective element 4 installed in the robot R1 to the reflective element 4 installed in the robot R2 to identify the position of the robot R2.

The irradiation direction movement unit 201 discriminates the image of the reflective element 4 by analyzing an image of the imaging result of the first imaging unit 23. In the process of driving the irradiation unit to track the reflective element 4, the irradiation direction movement unit 201 iteratively performs image analysis to discriminate the image of the reflective element 4 at each time.

As described above, the first imaging unit 23 receives light from a space where the reflective element 4 is arranged. That is, the first imaging unit 23 is included in the second detection unit that receives light from the space where the reflective element 4 is arranged.

On the basis of the detection result of the second detection unit, the irradiation direction movement unit 201 discriminates the position of the reflective element 4 serving as the measurement target and moves in the irradiation direction of the measurement light.

In this way, the measurement light of the optical frequency comb interferometer 11 included in the distance measurement unit 200 is irradiated toward the reflective element 4 (step S30). When the measurement light is irradiated to the reflective element 4, the reflected light is reflected in total reflection.

In addition, the reflective element 4 may not be a total reflective element. For example, a corner cube reflector may be used as the reflective element 4. The corner cube reflector may be a reflective element of a corner cube having a reflection increasing film. As the reflective element 4, a ball reflector or a cat's eye may be used.

Here, in the process of capturing the image of the reflective element 4 described above (step S10), the movement device 3 may be moving. On the basis of the imaging result of the first imaging unit 23, the process (step S20) of controlling the irradiation direction movement unit 201 so that the measurement light is irradiated to the reflective element 4 is executed after the movement device 3 stops. Therefore, the process of radiating the measurement light toward the reflective element 4 (step S30) is executed after the movement device 3 stops. That is, the irradiation unit provided in the distance measurement unit 200 irradiates measurement light to the reflective element 4 after the movement device 3 stops. In addition, the irradiation unit provided in the distance measurement unit 200 may irradiate measurement light to the reflective element 4 in a state in which the movement device 3 is moving (while the movement device 3 is moving).

The reflected light from the reflective element 4 passes through a path identical to that of the measurement light in the opposite direction and is received by the light reception unit of the distance measurement unit 200 including the optical frequency comb interferometer 11 (step S40). Also, a part of the reflected light is detected by the four-division PSD 12. On the basis of the detection result of the four-division PSD 12, the control unit 22 again controls the irradiation direction movement unit 201 so that the measurement light is continuously irradiated to the reflective element 4. Here, the control unit 22 finely adjusts the irradiation direction of the measurement light with the irradiation direction movement unit 201 on the basis of the detection result of the four-division PSD 12.

Here, the four-division PSD 12 receives light from the space where the reflective element 4 is arranged. The four-division PSD 12 is included in a first detection unit that receives light from the space where the reflective element 4 is arranged. Therefore, the irradiation direction movement unit 201 discriminates the position of the reflective element 4 serving as the measurement target on the basis of the detection result of the first detection unit and drives the irradiation unit provided in the distance measurement unit 200 so that the measurement light is irradiated to the reflective element 4.

In the movable position measurement device 1, even if the measurement light is lost in a measurement process, the irradiation direction movement unit 201 can drive the irradiation unit so that the measurement light is irradiated to the reflective element 4 with the accuracy of the order of sub-micrometers in the optical frequency comb interferometer 11. For example, the case where the measurement light is lost is a case where an obstacle is continuously located between the distance measurement unit 200 and the reflective element 4 or the like.

The position information acquisition unit 203 acquires the position information of the reflective element 4 from the detection result (distance information) of the distance measurement unit 200 including the optical frequency comb interferometer 11 and the direction information measured by the irradiation direction measurement unit 202 (step S50). The acquired position information is output to the calculation unit 26 via the control unit 22. The position information is expressed in three-dimensional spherical coordinates using the position measurement device 2 as a reference. At this time, the position information may be converted into Cartesian coordinates using the position measurement device 2 as the reference.

The control unit 22 transmits the position information acquired by the position information acquisition unit to the control system (step S60). The control system is a control system that controls the robot on which the reflective element 4 is installed. The control unit 22 causes the communication unit 25 to transmit position information through wireless communication.

As described above, the control unit 22 ends the position measurement process.

When the control system receives the position information from the movable position measurement device 1, the control system controls the robot on the basis of the position information. The control system calibrates the position of the movable unit of the robot on the basis of the position information.

Although an example in which the movable position measurement device 1 measures the position information of the reflective element 4 has been described in the present embodiment, the present invention is not limited thereto. The movable position measurement device 1 may transmit one or more items of the distance information and the direction information as a measurement result to the control system.

Second Embodiment

Hereinafter, a second embodiment of the present invention will be described in detail with reference to the drawings.

In the above-described first embodiment, the case where the imaging result of imaging the reflective element 4 in the first imaging unit 23 (the coaxial camera 13) is used to change the irradiation direction of the measurement light in the movable position measurement device 1 has been described. In the present embodiment, a case where a second imaging unit having a wider imaging range than a first imaging unit 23 images a reflective element 4 in advance before the first imaging unit 23 images the reflective element 4 will be described.

A movable position measurement device according to the present embodiment is referred to as a movable position measurement device 1*a* and a position measurement device is referred to as a position measurement device 2*a*.

In addition, components identical to those of the first embodiment described above may be denoted by the same reference signs and description of the same components and operations may be omitted.

FIG. 6 is a diagram showing an example of a configuration of the position measurement device 2*a* according to the present embodiment. The position measurement device 2*a* includes a housing 10, an optical frequency comb interferometer 11, a four-division PSD 12, a coaxial camera 13, a beam steering mirror 14, a PMA 15, a first half mirror 16, a second half mirror 17, and a 360-degree camera 18.

The 360-degree camera 18 images its surroundings in a 360-degree range. The 360-degree camera 18 images its surroundings in a range of 360 degrees by periodically rotating the imaging unit having a predetermined imaging range in the horizontal direction.

In the following description, the imaging range is indicated by a horizontal angle of view and/or a vertical angle of view. The horizontal angle of view is an angle of view in the horizontal direction and the vertical angle of view is an angle of view in the vertical direction. In the imaging range of the 360-degree camera 18, a horizontal angle of view is 360 degrees and a vertical angle of view is, for example, −45 degrees to 225 degrees.

It is assumed that the imaging range of the 360-degree camera 18 includes a robot on which the reflective element 4 is installed. It is assumed that no physical object (obstacle)

is arranged between the 360-degree camera 18 and the robot so that the robot is not included in the imaging range of the 360-degree camera 18.

In addition, the accuracy of the position of the reflective element 4 identified on the basis of the image of the reflective element 4 imaged by the 360-degree camera 18 is lower than the accuracy of the position of the reflective element 4 determined on the basis of the image of the reflective element 4 imaged by the coaxial camera 13.

In addition, the position measurement device 2*a* may include a camera having a predetermined angle of view instead of the 360-degree camera 18. The camera may be, for example, a wide-angle camera having a horizontal angle of view of 120 degrees to 150 degrees. Also, the angle of view of the camera may be a horizontal angle of view larger or smaller than a horizontal angle of view of 120 degrees to 150 degrees.

Figure 7:
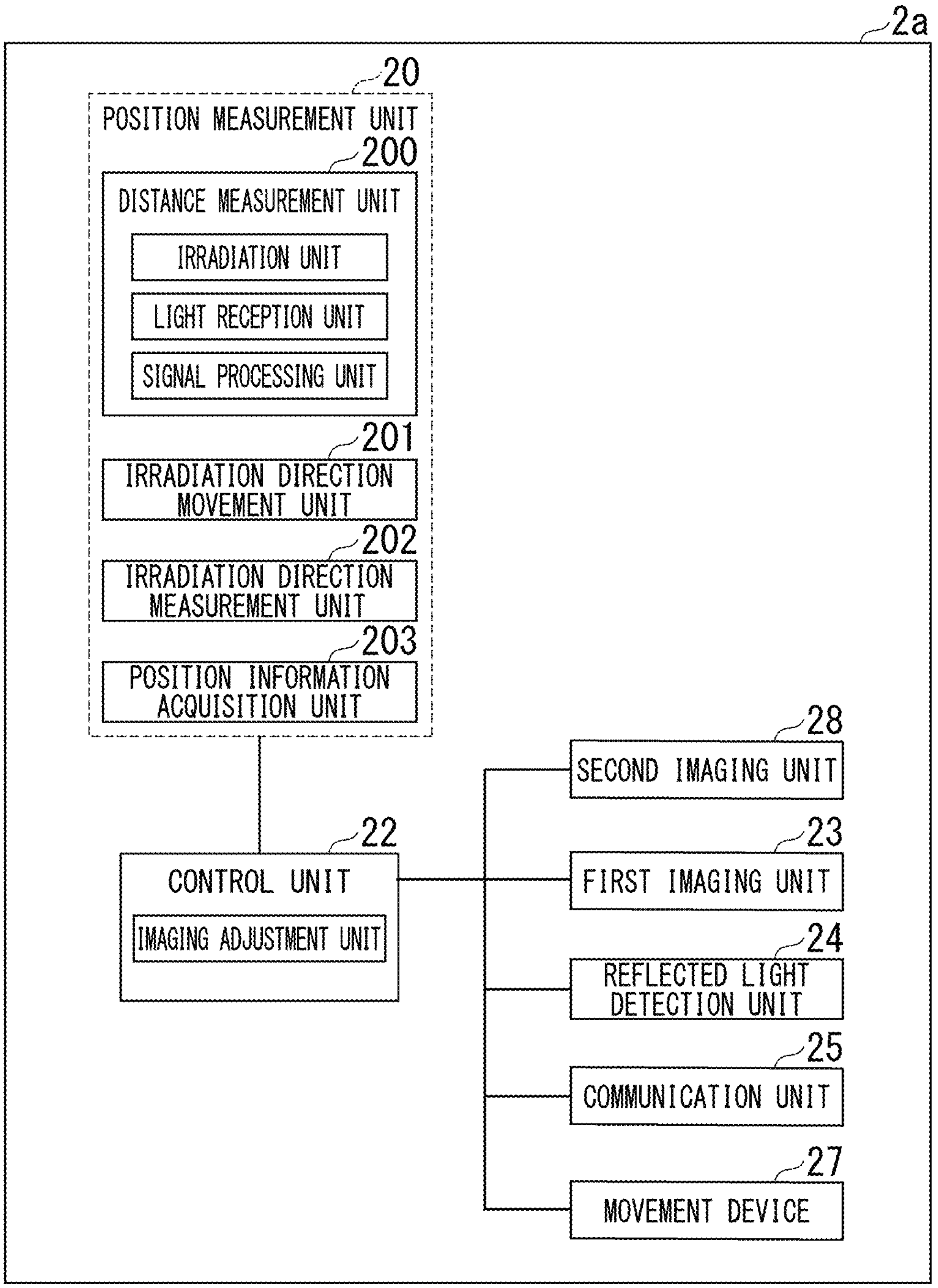
FIG. 7 is a diagram showing an example of a functional configuration of the position measurement device according to the second embodiment.

FIG. 7 is a diagram showing an example of a functional configuration of the position measurement device 2*a* according to the present embodiment. The position measurement device 2*a* includes a position measurement unit 20, a control unit 22, a first imaging unit 23, a reflected light detection unit 24, a communication unit 25, a movement device 27, and a second imaging unit 28.

The second imaging unit 28 captures an image of the reflective element 4. The imaging range of the second imaging unit 28 is wider than the imaging range of the first imaging unit 23. The second imaging unit 28 includes a 360-degree camera 18. In addition, the second imaging unit 28 may include a camera having a predetermined angle of view instead of the 360-degree camera 18. The camera may be, for example, a wide-angle camera having a horizontal angle of view of 120 degrees to 150 degrees. The angle of view of the camera may be a horizontal angle of view larger or smaller than a horizontal angle of view of 120 degrees to 150 degrees.

Figure 8:
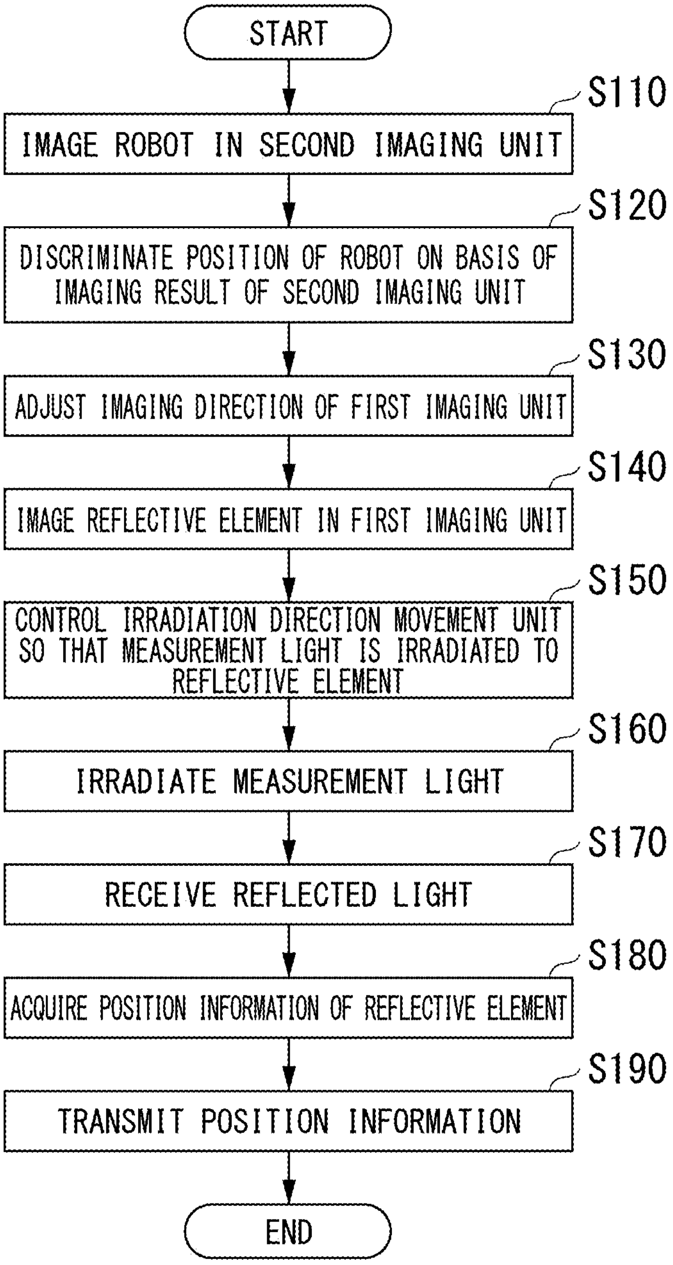
FIG. 8 is a diagram showing an example of a position measurement process according to the second embodiment.

Next, a position measurement process of the movable position measurement device 1*a* will be described with reference to FIG. 8. FIG. 8 is a diagram showing an example of the position measurement process according to the present embodiment. The position measurement process is executed by the control unit 22.

The imaging adjustment unit provided in the control unit 22 captures an image of the robot, which is the measurement target, using the second imaging unit 28 (step S110). It is only necessary for the imaging adjustment unit to image at least a part of the robot using the second imaging unit 28.

The imaging adjustment unit provided in the control unit 22 discriminates the position of the robot serving as the measurement target on the basis of the imaging result of the second imaging unit 28 (step S120). Here, the imaging adjustment unit provided in the control unit 22 discriminates the image of the robot within the angle of view of the imaging result of the second imaging unit 28 on the basis of image analysis. The imaging adjustment unit discriminates the position of the robot by discriminating the image of the robot on the basis of, for example, pattern matching and/or image analysis such as machine learning.

Figure 9:
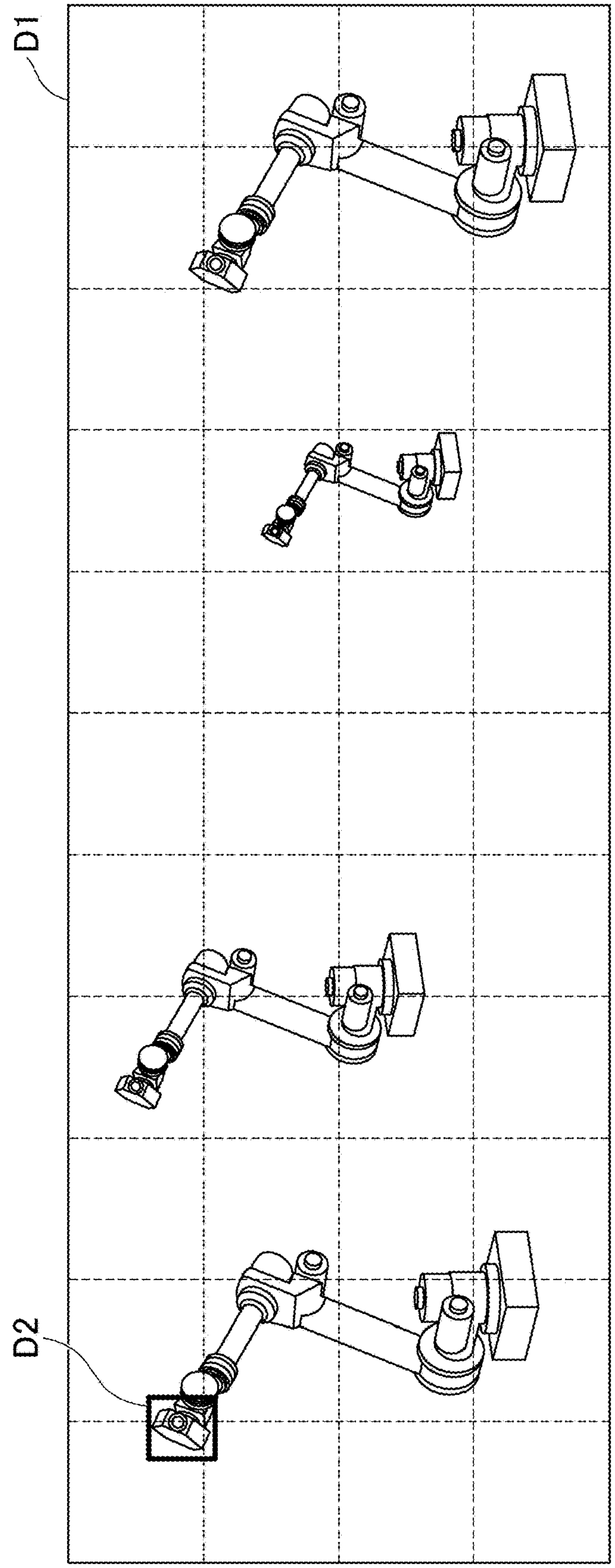
FIG. 9 shows an example of an imaging result of a second imaging unit according to the second embodiment.

In FIG. 9, an example of the imaging result of the second imaging unit 28 is shown. An imaging range D1 is a 360-degree range around the position measurement device 2 imaged by the second imaging unit 28. An imaging range D2 is the imaging range of the first imaging unit 23. The imaging range of the first imaging unit 23 is, as an example, substantially rectangular. In the example shown in FIG. 9, an image of each of robots R91, R92, R93, and R94 is included in the imaging range D1. In the example shown in FIG. 9, the reflective element 4 installed in the robot R91 is included in the imaging range D2.

Here, the imaging range of the second imaging unit 28 is wider than the imaging range of the first imaging unit 23 in both the horizontal and vertical directions. Therefore, the imaging adjustment unit discriminates the position of the reflective element 4 in both the horizontal and vertical directions on the basis of the imaging result of the second imaging unit 28.

In addition, the imaging range D1 shown in FIG. 9 is an imaging range of the 360-degree camera 18 when the second imaging unit 28 includes the 360-degree camera 18. When the second imaging unit 28 includes a camera having a predetermined angle of view instead of the 360-degree camera 18, the imaging range D1 changes with the angle of view. For example, when the second imaging unit 28 includes a wide-angle camera having a horizontal angle of view of 120 degrees to 150 degrees, the imaging range D1 is a range of 120 degrees to 150 degrees around the position measurement device 2.

Also, when the second imaging unit 28 includes, for example, an omnidirectional camera having a horizontal angle of view of 360 degrees and a vertical angle of view of 180 degrees, the imaging range D1 is an imaging range in which the horizontal angle of view is 360 degrees and the vertical angle of view is 180 degrees as in an omnidirectional image. In addition, when the second imaging unit 28 includes, for example, a hemispherical camera having a horizontal angle of view of 360 degrees and a vertical angle of view smaller than 180 degrees, the imaging range D1 is an imaging range in which a horizontal angle of view is 360 degrees and a vertical angle of view is smaller than 180 degrees as in a hemispherical image.

The position measurement process will be continuously described with reference back to FIG. 8.

The imaging adjustment unit provided in the control unit 22 adjusts the imaging direction of the first imaging unit 23 (step S130). Here, the imaging adjustment unit provided in the control unit 22 discriminates the position of the robot serving as the measurement target on the basis of the imaging result of the second imaging unit 28 and makes an adjustment so that the imaging direction of the first imaging unit 23 is directed to the position of the robot.

Here, the imaging adjustment unit adjusts the imaging direction of the first imaging unit 23 to track the robot serving as the measurement target on the basis of the imaging result of the second imaging unit 28. The imaging adjustment unit causes the robot to track the imaging direction of the first imaging unit 23 by recognizing an image of a predetermined target included in the imaging result of the second imaging unit 28. The predetermined target is, for example, one or more of a feature of the robot as a whole, a feature of the tip part of the robot arm, a feature of a part of the robot other than the tip part, a feature of a mark assigned to the robot, an end effector attached to the tip of the robot, the reflective element, and the like. Because the imaging direction of the first imaging unit 23 is adjusted to track the robot, the first imaging unit 23 can continuously image the robot even if the robot moves.

In addition, in step S120, the measurement target whose position is discriminated is not limited to a current measurement target for tracking the imaging direction of the first imaging unit 23. The control unit 22 may discriminate a position of the robot to be newly measured on the basis of the imaging result of the second imaging unit 28. Although the imaging adjustment unit provided in the control unit 22 discriminates the position of the robot R91 by designating the robot R91 as the measurement target, for example, in the example shown in FIG. 9 described above, the imaging adjustment unit provided in the control unit 22 may discriminate the position of the robot of the measurement target according to the imaging result of the second imaging unit when the measurement target is changed from the robot R91 to the robot R92, the robot R93, the robot R94, or the like. In this case, the imaging adjustment unit provided in the control unit 22 may discriminate the position of the measurement target after the measurement target is changed on the basis of the first imaging unit 23 with respect to a plurality of measurement targets. That is, after the measurement target is changed, the imaging direction may be adjusted so that it is directed to the position of the measurement target (to track the measurement target) on the basis of the imaging result of the first imaging unit. Because the imaging direction of the first imaging unit 23 is adjusted to the measurement target after the change in the imaging adjustment unit provided in the control unit 22, the first imaging unit 23 can image the measurement target after the change even if the measurement target is changed.

The second imaging unit 28 receives light from a space where the measurement target object on which the reflective element 4 is provided is arranged. The second imaging unit 28 includes a third detection unit that receives light from the space where the measurement target object on which the reflective element 4 is provided is arranged. On the basis of the detection result of the third detection unit, the imaging adjustment unit moves in the detection direction of the second detection unit that receives light from the space where the reflective element 4 is arranged. The imaging adjustment unit is a detection direction movement unit that moves in the detection direction of the second detection unit on the basis of the detection result of the third detection unit.

The second detection unit includes the first imaging unit 23. The third detection unit includes the second imaging unit 28 having a wider imaging range than the first imaging unit 23. Although the imaging range of the second imaging unit 28 is wider than that of the first imaging unit 23, the adjustment accuracy based on the imaging result of the second imaging unit 28 is lower than the adjustment accuracy based on the imaging result of the first imaging unit 23.

Because the processing of steps S140 to S190 is similar to the processing of steps S10 to S60 in FIG. 5, description thereof will be omitted.

With this, the control unit 22 ends the position measurement process.

In addition, the position at which the movable position measurement device 1*a* stops may be determined on the basis of the imaging result of the second imaging unit 28. In this case, it is not necessary to provide the first imaging unit 23. The movable position measurement device 1*a* moves to a measurement position that is a position for measuring the position of the measurement target in the factory. The control unit 22 images the measurement target in advance with the second imaging unit 28 in a period before the measurement starts and determines the measurement position on the basis of the imaging result of the second imaging unit 28. When the movable position measurement device 1*a* moves to the determined measurement position in the factory, it stops at the measurement position. In this case, the control unit 22 may determine the measurement position in a state in which the movable position measurement device 1*a* is stopped in the period before the measurement starts or may determine the measurement position in a state in which the movable position measurement device 1*a* is moving.

Also, for example, when it is determined that the position of the measurement target is far from the position of the movable position measurement device 1*a* on the basis of the imaging result of the second imaging unit 28, the movable position measurement device 1*a* first moves closer to the measurement target. At that time, the movable position measurement device 1*a* moves while changing the direction of the movable position measurement device 1*a* itself so that the direction of the movable position measurement device 1*a* itself is a direction in which it is easy to measure the measurement target. The direction in which it is easy to measure the measurement target is, for example, the direction in which the reflective element 4 can be seen from the front. For example, the movable position measurement device 1*a* determines an image of the front of the reflective element 4 on the basis of image recognition and determines the direction in which the reflective element 4 can be seen from the front. The movable position measurement device 1*a* may determine the imaging direction of the second imaging unit 28 in which an area of the image of the reflective element 4 is largest in the image captured by the second imaging unit 28 as the direction in which the reflective element 4 can be seen from the front.

Third Embodiment

Hereinafter, a third embodiment of the present invention will be described in detail with reference to the drawings.

A position measurement result of a movable position measurement device may be affected by vibrations of the movable position measurement device itself. In the present embodiment, a case where the movable position measurement device performs the position measurement process only when the movable position measurement device itself is not vibrating or when the vibration of the movable position measurement device itself is in an environment of negligible vibrations will be described. The vibration to a degree that the vibration of the movable position measurement device itself is negligible is a vibration that does not affect the accuracy required in the process of measuring the position of the measurement target. In addition, a vibration damping mechanism or/and a vibration isolation mechanism may be provided in the movable position measurement device to suppress the vibration of the position measurement unit.

The movable position measurement device according to the present embodiment is referred to as a movable position measurement device 1*b* and the position measurement device is referred to as a position measurement device 2*b*.

In addition, components identical to those of the above-described embodiment may be denoted by the same reference signs and description of the same components and operations may be omitted.

Figure 10:
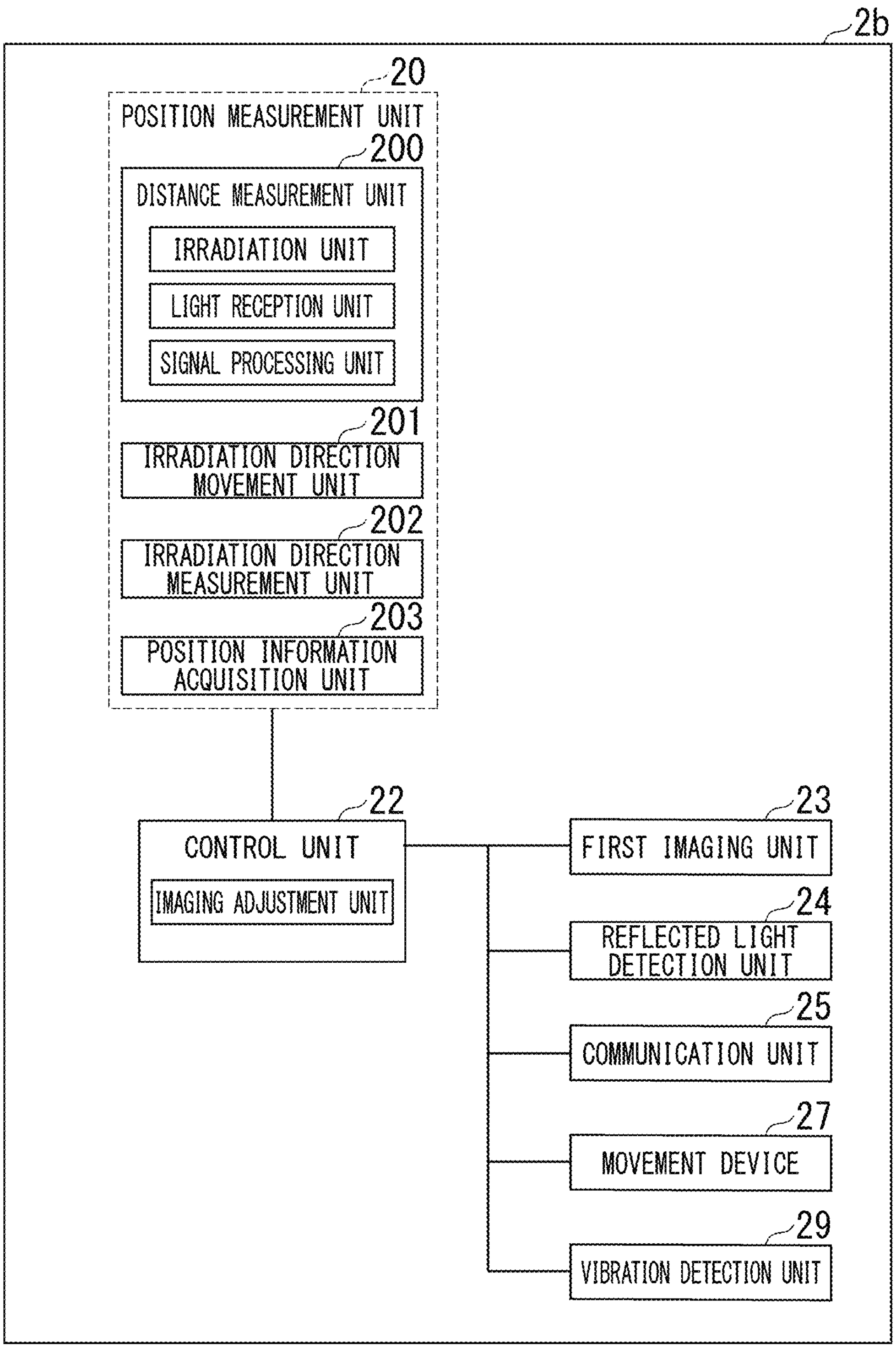
FIG. 10 is a diagram showing an example of a functional configuration of a position measurement device according to a third embodiment.

FIG. 10 is a diagram showing an example of a functional configuration of the position measurement device 2*b* according to the present embodiment. The position measurement device 2*b* includes a position measurement unit 20, a control unit 22, a first imaging unit 23, a reflected light detection unit 24, a communication unit 25, a movement device 27, and a vibration detection unit 29. The position measurement device 2*b* may include a second imaging unit 28 like the position measurement device 2*a* according to the second embodiment described above.

The vibration detection unit 29 detects vibrations of at least a part of the position measurement device 2*b*. The vibration detection unit 29 includes one or more of a speed sensor, an acceleration sensor, an angular rate sensor, an angular acceleration sensor, and a gyro sensor.

The vibration detection unit 29 detects the amount of vibration in at least one or more directions of roll, pitch, and yaw. Each of the roll, pitch, and yaw indicates, for example, rotation around the X-axis, rotation around the Y-axis, and rotation around the Z-axis. Also, the vibration detection unit 29 may individually detect high-frequency vibrations and low-frequency vibrations by analyzing the amount of vibration in time series.

In addition, the vibration detection unit 29 may detect the vibrations of the position measurement device 2*b* on the basis of the image captured by the first imaging unit 23. When the position measurement device 2*b* is vibrating, the first imaging unit 23 provided in the housing 10 vibrates. In this case, in the image captured by the first imaging unit 23, a state in which the reflective element 4, a landscape or the like vibrates is imaged. Also, when the second imaging unit 28 is provided in the position measurement device 2*b*, the vibration detection unit 29 may detect the vibrations of the position measurement device 2*b* on the basis of the image captured by the second imaging unit 28.

Figure 11:
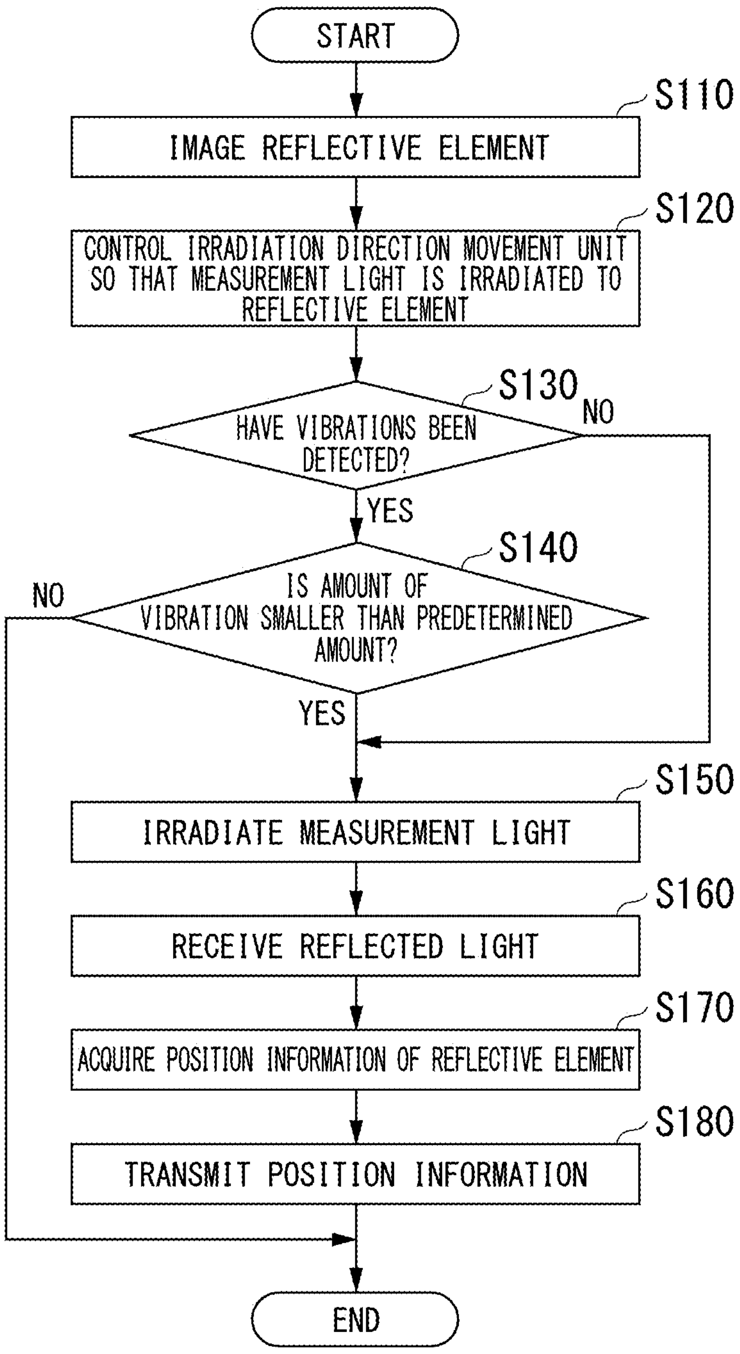
FIG. 11 is a diagram showing an example of a position measurement process according to the third embodiment.

Next, a position measurement process by the movable position measurement device 1*b* will be described with reference to FIG. 11. FIG. 11 is a diagram showing an example of the position measurement process according to the present embodiment. The position measurement process is executed by the control unit 22.

In addition, because the processing of steps S110, S120, and S150 to S180 is similar to the processing of steps S10, S20, and S30 to S60 in FIG. 5, description thereof will be omitted The control unit 22 determines whether or not vibrations have been detected by the vibration detection unit 29 (step S130). When the vibration detection unit 29 detects the vibrations, the vibration detection unit 29 outputs a detection result indicating the amount of vibration to the control unit 22. The control unit 22 determines that vibrations have been detected when the vibration detection result has been acquired from the vibration detection unit 29.

In addition, the control unit 22 may determine whether or not there are vibrations on the basis of a vibration frequency even if the amount of vibration is the same. For example, the control unit 22 may determine that no vibration has been detected in the case of high-frequency (long-cycle) vibrations and vibrations have been detected in the case of low-frequency (short-cycle) vibrations. A threshold value for determining whether the frequency is low or high may be determined on the basis of a time period required for the position measurement device 2*b* to measure the position of the measurement target.

When it is determined that vibrations have been detected by the vibration detection unit 29 (step S130; YES), the control unit 22 determines whether or not the amount of vibration is smaller than a predetermined amount (also referred to as vibration stop sensitivity) (step S140). Here, the control unit 22 performs a determination process by comparing the amount of vibration indicated in the detection result acquired from the vibration detection unit 29 with the predetermined amount.

The vibration stop sensitivity may be set in advance as a design value at the time of manufacturing the position measurement device 2*b*, or may be set by a user of the position measurement device 2*b*. When the vibration stop sensitivity is set by the user, the user can easily set the vibration stop sensitivity by selecting a value indicating a degree of vibration stop sensitivity. For example, the user selects one of three values such as “large,” “medium,” and “small” as a value indicating the degree of vibration stop sensitivity. In this case, the control unit 22 sets a predetermined set value according to the selected value as the vibration stop sensitivity. In addition, when the vibration stop sensitivity is set by the user, the user may continuously change and set the vibration stop sensitivity or the user may input a value for the vibration stop sensitivity.

When the control unit 22 determines that the amount of vibration is smaller than the predetermined amount (step S140; YES), the control unit 22 executes the processing subsequent to step S150. That is, the control unit 22 irradiates measurement light to the reflective element 4 when the amount of vibration detected by the vibration detection unit 29 is smaller than the predetermined amount.

When the control unit 22 determines that the amount of vibration is larger than the predetermined amount (step S140; NO), the position measurement process ends. That is, when the amount of vibration of the position measurement device 2 is larger than the predetermined amount, the control unit 22 ends the position measurement process without radiating the measurement light.

On the other hand, when vibrations have not been detected by the vibration detection unit 29 (step S130; NO), the control unit 22 executes the processing subsequent to step S150. Therefore, the control unit 22 irradiates measurement light to the reflective element 4 when the vibrations have not been detected by the vibration detection unit 29. That is, the irradiation unit provided in the distance measurement unit 200 irradiates measurement light to the reflective element 4 on the basis of a detection result of the vibration detection unit 29.

With this, the control unit 22 ends the position measurement process.

Although the case where the control unit 22 ends the position measurement process without radiating the measurement light when the amount of vibration is larger than the predetermined amount has been described in the present embodiment, the present invention is not limited thereto. When the vibrations have been detected by the vibration detection unit 29, the control unit 22 may end the position measurement process without radiating the measurement light regardless of the amount of vibration.

Also, when vibrations have been detected by the vibration detection unit 29, the control unit 22 may perform a control process of causing the calculation unit 26 not to execute signal processing for calculating the distance after causing the distance measurement unit 200 to irradiate measurement light.

Also, when vibrations have been detected by the vibration detection unit 29 and the amount of vibration is larger than the predetermined amount, the control unit 22 may perform a control process of causing the calculation unit 26 not to execute signal processing for calculating position information after causing the distance measurement unit 200 to irradiate measurement light. That is, in this case, the position measurement unit 20 acquires the position information of the reflective element 4 on the basis of a light reception result received by the light reception unit provided in the optical frequency comb interferometer 11 when the amount of vibration detected by the vibration detection unit 29 is smaller than the predetermined amount.

Also, when vibrations have been detected by the vibration detection unit 29, the control unit 22 may determine whether or not to cause the position measurement unit 20 to acquire position information calculated by the calculation unit 26 after causing the distance measurement unit 200 to irradiate measurement light regardless of the amount of vibration and then causing the calculation unit 26 to further execute signal processing for calculating the position information.

In this case, the control unit 22, for example, causes the calculation unit 26 to generate reliability degree information on the basis of the amount of vibration indicated in the detection result of the vibration detection unit 29. The reliability degree information indicates that a reliability degree is lower when the amount of vibration indicated in the detection result is larger and that the reliability degree is higher when the amount of vibration indicated in the detection result is smaller. When the reliability degree information indicates a reliability degree greater than a predetermined value, the control unit 22 causes the position measurement unit 20 to acquire the position information calculated by the calculation unit 26. On the other hand, when the reliability degree information indicates a reliability degree less than the predetermined value, the control unit 22 does not cause the position measurement unit 20 to acquire the position information calculated by the calculation unit 26.

Fourth Embodiment

Hereinafter, a fourth embodiment of the present invention will be described in detail with reference to the drawings.

When position information of a measurement target is measured by a movable position measurement device 1, a change in a relative relationship between a position of the movable position measurement device 1 and a position of a measurement target can affect a measurement result as an error. The change can be caused, for example, by vibrations of a floor on which the measurement target is arranged. Also, when the movable position measurement device 1 and a robot of the measurement target are provided in a large workplace, a reaction force due to the movement of the robot propagates to the movable position measurement device 1 and therefore the change can be caused.

In the present embodiment, a case where the movable position measurement device corrects an influence on a result of measuring position information due to the change in the relative relationship between the movable position measurement device and the position of the measurement target on the basis of displacement of the movable position measurement device for a reference position will be described.

Also, in the present embodiment, calibration of the origin will also be described.

The movable position measurement device according to the present embodiment is referred to as a movable position measurement device 1*c* and a position measurement device is referred to as a position measurement device 2*c*.

In addition, components identical to those of the above-described embodiments may be denoted by the same reference signs and description of the same components and operations may be omitted.

Figure 12:
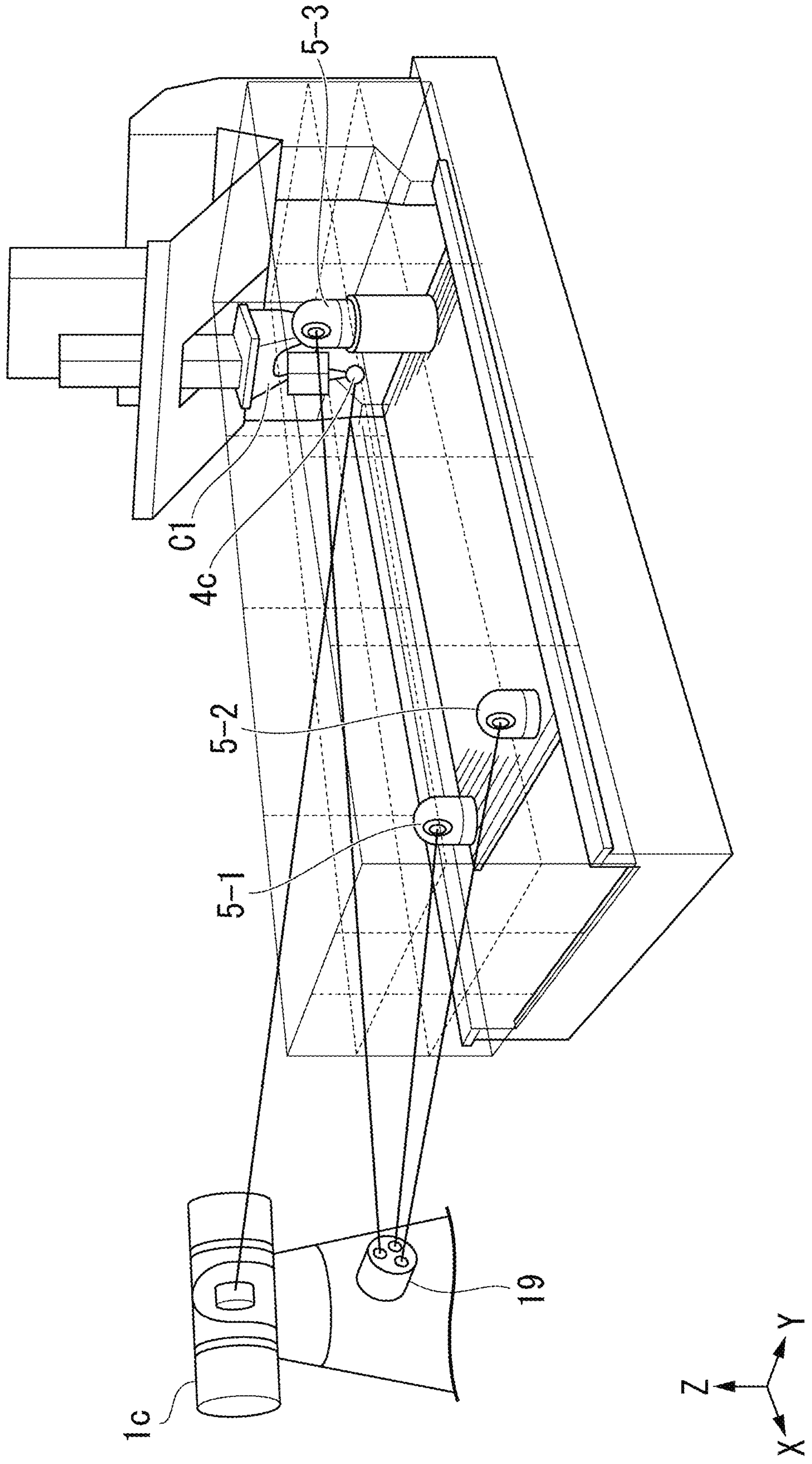
FIG. 12 is a diagram showing an example of a state in which a movable position measurement device according to a fourth embodiment measures a reference position.

FIG. 12 is a diagram showing an example of a state in which the movable position measurement device 1*c* according to the present embodiment measures a reference position. In the present embodiment, the measurement target is, as an example, a machine tool. The reflective element 4*c* is arranged in a movable unit of the machine tool. Here, in the present embodiment, the machine tool has a processing head and the processing head has an end effector such as an end mill. As an example, the movable unit of the machine tool is a mechanism for changing an angle or position of the end mill to a desired angle or position.

As an example, the reference reflective element 5 includes three reflective elements, i.e., a first reference reflective element 5-1, a second reference reflective element 5-2, and a third reference reflective element 5-3.

The reference position is a predetermined position (for example, an origin) in a three-dimensional coordinate system based on a plurality of reference reflective elements 5. The position of the origin of the three-dimensional coordinate system is, for example, the position of any one of the plurality of reference reflective elements 5.

In the following description, the first reference reflective element 5-1, the second reference reflective element 5-2, and the third reference reflective element 5-3 may be collectively referred to as a plurality of reference reflective elements 5.

Each of the plurality of reference reflective elements 5 is a retroreflector. That is, each of the plurality of reference reflective elements 5 has a retroreflection function like the reflective element 4*c*.

The movable position measurement device 1*c* includes a reference measurement light irradiation unit 19. The reference measurement light irradiation unit 19 is provided as a part of the optical frequency comb interferometer 11. The reference measurement light irradiation unit 19 includes a first reference irradiation unit, a second reference irradiation unit, and a third reference irradiation unit.

In the present embodiment, the position measurement device 2*c* includes an optical system for branching the measurement light output from the optical frequency comb interferometer 11 inside of a housing 10. In the position measurement device 2*c*, the measurement light can be divided into a maximum of eight branches by the optical system. In the present embodiment, first reference measurement light, second reference measurement light, and third reference measurement light irradiated by the reference measurement light irradiation unit 19 are light into which the measurement light output from the optical frequency comb interferometer 11 is branched.

In addition, the first light reception unit that receives the first reference reflected light, the second light reception unit that receives the second reference reflected light, and the third light reception unit that receives the third reference reflected light are provided separately from the light reception unit provided in the optical frequency comb interferometer 11 that receives the reflected light reflected from the reflective element 4*c*.

Although an example in which the measurement light output from one optical frequency comb interferometer 11 is branched and a part of the branched measurement light is used as the first reference measurement light, the second reference measurement light, and the third reference measurement light will be described in the present embodiment, the present invention is not limited thereto. The position measurement device 2*c* may include an optical frequency comb interferometer that divides one measurement light beam into branches and outputs the branches as the first reference measurement light, the second reference measurement light, and the third reference measurement light separately from the optical frequency comb interferometer 11 that irradiates the measurement light inside of the housing 10.

The plurality of reference reflective elements 5 are arranged at different predetermined positions on the machine tool. The plurality of reference reflective elements 5 are arranged at a position where measurement light can be irradiated from the movable position measurement device 1*c*, such as a position behind the machine tool. Also, the plurality of reference reflective elements 5 are arranged at a position where the reference measurement light to be irradiated thereto can be irradiated without overlapping. In the example shown in FIG. 12, each of the plurality of reference reflective elements 5 is arranged on the surface plate of the machine tool.

In addition, the reference reflective element 5 may be arranged above the robot or machine tool or on the ceiling of the factory where the robot or machine tool is arranged.

Although it is assumed that the reference reflective element 5 is arranged at a predetermined position (i.e., a predetermined fixed position) in the machine tool in the present embodiment, the reference reflective element 5 may be arranged at a specific position of the movable unit (i.e., the movement unit) of the machine tool and the measurement of the reference position may be performed when the movable unit stops. Also, the operator may arrange the reference reflective element 5 at any position.

In the movable position measurement device 1*c*, the position measurement device 2*c* is mounted on the movement device 3. Therefore, the optical frequency comb interferometer 11 provided in the position measurement device 2*c* and the reference measurement light irradiation unit 19 provided in the optical frequency comb interferometer 11 are provided in the movement device 3.

The irradiation unit provided in the optical frequency comb interferometer 11 is provided in the movement device 3 and is included in a first irradiation unit that irradiates the first measurement light to the first reflective element provided on the measurement target object.

The reference measurement light irradiation unit 19 is provided in the movement device 3 and is included in a reference irradiation unit that irradiates the reference measurement light to a reference reflective element relating to a reference position in the space where the movement device 3 is arranged.

The signal processing unit provided in the optical frequency comb interferometer 11 is included in a measurement unit that acquires position information or distance information about the first reflective element for the reference position on the basis of the first reflected light of the first measurement light from the first reflective element and the reference reflection light of the reference measurement light from the reference reflective element.

Figure 13:
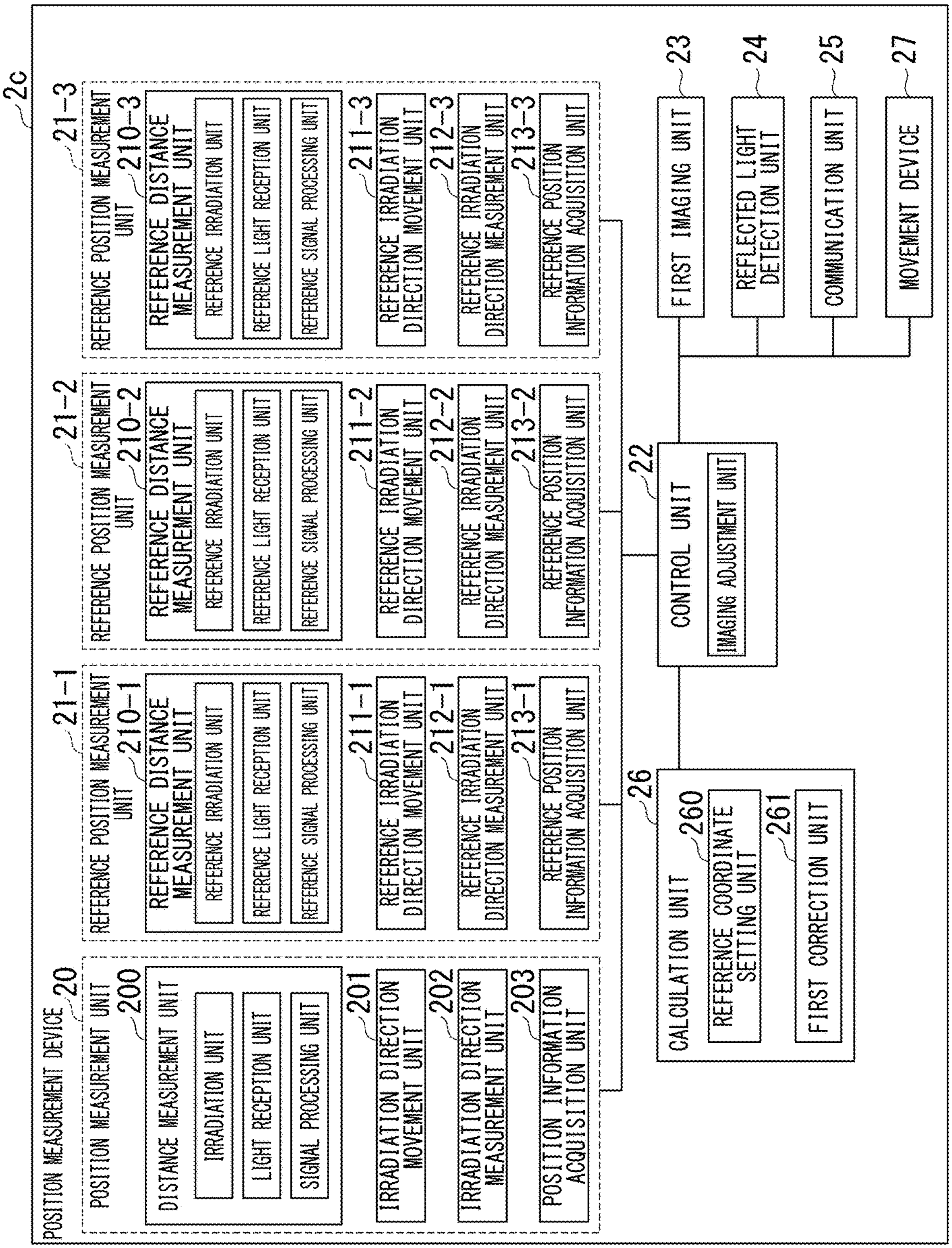
FIG. 13 is a diagram showing an example of a functional configuration of a position measurement device according to the fourth embodiment.

FIG. 13 is a diagram showing an example of a functional configuration of the position measurement device 2*c* according to the present embodiment. The position measurement device 2*c* includes a position measurement unit 20, a reference position measurement unit 21, a control unit 22, a first imaging unit 23, a reflected light detection unit 24, a communication unit 25, a calculation unit 26, and a movement device 27.

As an example, the reference position measurement unit 21 includes three parts: a reference position measurement unit 21-1, a reference position measurement unit 21-2, and a reference position measurement unit 21-3. The number of reference position measurement units 21 may be a number other than three.

In the following description, the reference position measurement unit 21-1, the reference position measurement unit 21-2, and the reference position measurement unit 21-3 may be collectively referred to as the reference position measurement unit 21. Because the reference position measurement unit 21-1, the reference position measurement unit 21-2, and the reference position measurement unit 21-3 have the same function as each other, the reference position measurement unit 21 is represented by the reference position measurement unit 21-1 here. A functional configuration of the reference position measurement unit 21 will be described and the description of the reference position measurement unit 21-2 and the reference position measurement unit 21-3 will be omitted.

The reference position measurement unit 21-1 includes a reference distance measurement unit 210-1, a reference irradiation direction movement unit 211-1, a reference irradiation direction measurement unit 212-1, and a reference position information acquisition unit 213-1.

The reference distance measurement unit 210-1 irradiates reference measurement light to the first reference reflective element 5-1, receives the reference reflected light, and measures a distance to the first reference reflective element 5-1. The reference distance measurement unit 210-1 includes a first reference irradiation unit, a first reference light reception unit, and a first reference signal processing unit.

The first reference irradiation unit irradiates first reference measurement light to the first reference reflective element 5-1. The first reference irradiation unit includes an optical system for dividing the measurement light output from the optical frequency comb interferometer 11 into branches.

The first reference light reception unit receives first reference reflected light from the first reference reflective element 5-1. A light reception unit provided inside of the housing 10 of the movable position measurement device 1*c* is included.

The first reference signal processing unit processes a signal from the first reference light reception unit and acquires first reference distance information. The first reference distance information is information indicating a distance from the movable position measurement device 1*c* to the first reference reflective element 5-1.

The reference irradiation direction movement unit 211-1 changes an irradiation direction of the reference measurement light. Changing the irradiation direction is also referred to as moving the irradiation direction. The reference irradiation direction movement unit 211-1 includes a gimbal unit included in a PMA 15.

The reference irradiation direction measurement unit 212-1 measures the irradiation direction of the reference measurement light.

The reference position information acquisition unit 213-1 acquires a position (first reference position information) of the first reference reflective element 5-1 in the three-dimensional space from a distance (distance information) to the first reference reflective element 5-1 measured by the reference distance measurement unit 210 and the irradiation direction (direction information) of the reference measurement light measured by the reference irradiation direction measurement unit 212-1. Details of the acquisition of reference position information will be described below.

The reference position measurement unit 21-2 irradiates reference measurement light to the second reference reflective element 5-2, receives reference reflected light, and measures a position of the second reference reflective element 5-2. The reference position measurement unit 21-3 irradiates reference measurement light to the third reference reflective element 5-3, receives reference reflected light, and measures a position of the third reference reflective element 5-3. Because the functional configurations of the reference position measurement unit 21-2 and the reference position measurement unit 21-3 are similar to that of the reference position measurement unit 21-1, detailed description thereof will be omitted.

In addition, any one of the reference distance measurement unit 210-1, the reference distance measurement unit 210-2, and the reference distance measurement unit 210-3 may simply be referred to as a reference distance measurement unit 210. Also, the reference distance measurement unit 210-1, the reference distance measurement unit 210-2, and the reference distance measurement unit 210-3 may be collectively referred to as a plurality of reference distance measurement units 210.

Also, any one of the reference irradiation direction movement unit 211-1, the reference irradiation direction movement unit 211-2, and the reference irradiation direction movement unit 211-3 may simply be referred to as a reference irradiation direction movement unit 211. Also, the reference irradiation direction movement unit 211-1, the reference irradiation direction movement unit 211-2, and the reference irradiation direction movement unit 211-3 may be collectively referred to as a plurality of reference irradiation direction movement units 211.

Also, any one of the reference irradiation direction measurement unit 212-1, the reference irradiation direction measurement unit 212-2, and the reference irradiation direction measurement unit 212-3 may simply be referred to as a reference irradiation direction measurement unit 212. Also, the reference irradiation direction measurement unit 212-1, the reference irradiation direction measurement unit 212-2, and the reference irradiation direction measurement unit 212-3 may be collectively referred to as a plurality of reference irradiation direction measurement units 212.

Also, any one of the reference position information acquisition unit 213-1, the reference position information acquisition unit 213-2, and the reference position information acquisition unit 213-3 may simply be referred to as a reference position information acquisition unit 213. Also, the reference position information acquisition unit 213-1, the reference position information acquisition unit 213-2, and the reference position information acquisition unit 213-3 may be collectively referred to as a plurality of reference position information acquisition units 213.

The calculation unit 26 includes a reference coordinate setting unit 260 and a first correction unit 261.

The reference coordinate setting unit 260 sets a reference (origin) and a reference coordinate system on the basis of the first reference position information, the second reference position information, and the third reference position information.

The first correction unit 261 acquires position information of the reflective element 4*c* for a reference generated by the reference coordinate setting unit 260. Acquiring the position information of the reflective element 4 for the reference includes acquiring the position information of the reflective element 4 in the set reference coordinate system. The first correction unit 261 further corrects a change in the position information for the reference of the reflective element 4.

Here, the first correction unit 261 converts the position of the reflective element 4 indicated in the position information on the basis of a position for the reference position of the movable position measurement device 1*c* indicated in the reference position information and a position of the reflective element 4 indicated in the position information acquired by the position measurement unit 20. The first correction unit 261 converts the position of the reflective element 4 for the movable position measurement device 1*c* into the position of the reflective element 4 for the reference (origin) in this conversion. The first correction unit 261 generates information indicating the position of the reflective element 4 in a reference coordinate frame as the corrected position information.

The reference position information acquisition unit 213 acquires the position information corrected by the first correction unit 261 as position information for the reference (origin) of the reflective element 4*c*.

Figure 14:
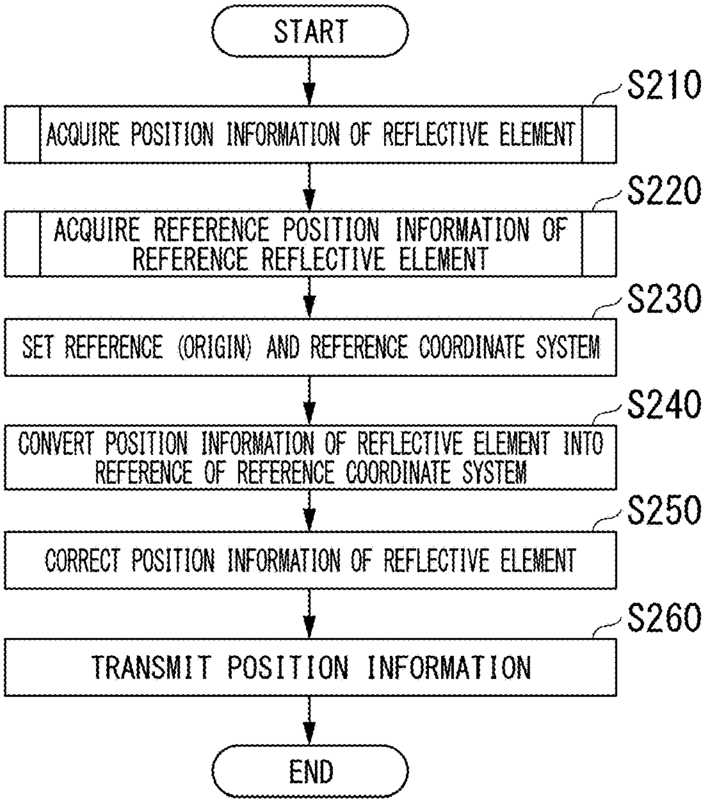
FIG. 14 is a diagram showing an example of a position measurement process according to the fourth embodiment.

Next, a position measurement process of the movable position measurement device 1*c* will be described with reference to FIG. 14. FIG. 14 is a diagram showing an example of the position measurement process according to the present embodiment. The position measurement process is executed by the control unit 22.

The position measurement unit 20 acquires the position information of the reflective element 4*c* (step S210). Here, because a process of acquiring the position information of the reflective element 4*c* in step S210 is similar to the above-described position measurement process in FIG. 5, description thereof will be omitted.

The reference position measurement unit 21-1 acquires the reference position information of the first reference reflective element 5-1 (step S220).

Figure 15:
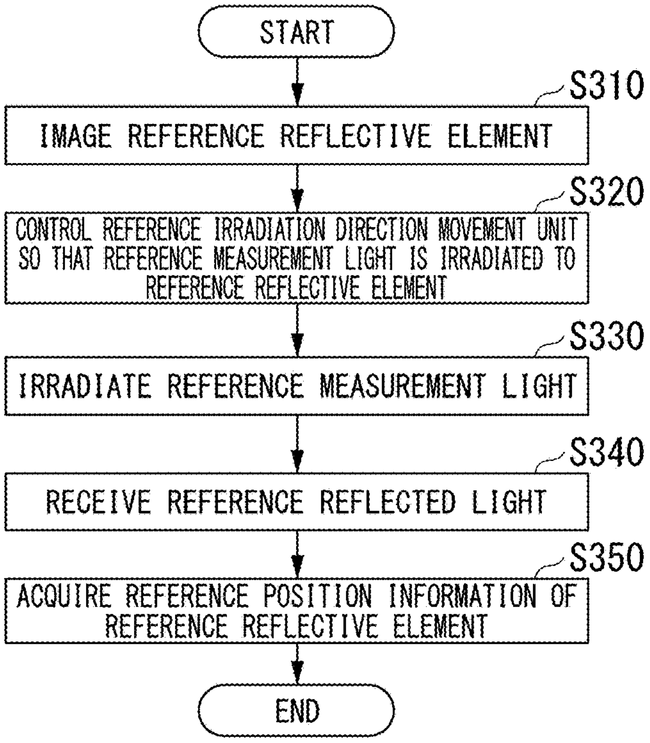
FIG. 15 is a diagram showing an example of a reference position information generation process according to the fourth embodiment.

Here, details of a process in which the reference position measurement unit 21-1 generates reference position information of the first reference reflective element 5-1 (referred to as a reference position information generation process) will be described with reference to FIG. 15. FIG. 15 is a diagram showing an example of the reference position information generation process according to the present embodiment. The processing of steps S310 to S350 shown in FIG. 15 is executed as the processing of step S220 shown in FIG. 14.

The processing of steps S310 to S350 shown in FIG. 15 may be executed at the start of measurement.

The control unit 22 uses the first imaging unit 23 to capture images of a plurality of reference reflective elements 5 (step S310).

The control unit 22 controls each of the plurality of reference irradiation direction movement units 211 so that each of the three reference measurement light beams is irradiated to one of the plurality of reference reflective elements 5 (step S320). In the control of step S320, the control unit 22 uses results of capturing the images of the plurality of reference reflective elements 5 in the first imaging unit 23.

The control unit 22 controls the reference irradiation direction movement unit 211 so that a plurality of reference measurement light beams are irradiated to the plurality of reference reflective elements 5 (step S330). The control unit 22 may cause the plurality of reference irradiation units to irradiate reference measurement light simultaneously or sequentially.

In the control unit 22, the reflected light from the reference reflective element 5 passes through a path identical to that of the reference measurement light in the opposite direction and is received by the reference light reception unit provided in the reference distance measurement unit 210 (step S340).

The reference position information acquisition unit 213 acquires reference position information of the reference reflective element 5 from the measurement result (reference distance information) of the reference distance measurement unit 210 and the reference irradiation direction information acquired by the reference irradiation direction measurement unit 212 (step S350). In the present embodiment, the reference position generation process described here is performed in each of the reference position measurement unit 21-1, the reference position measurement unit 21-2, and the reference position measurement unit 21-3, and the first reference position information, the second reference position information, and the third reference position information are acquired. The acquired first, second, and third reference position information is output to the calculation unit 26 via the control unit 22. The reference position information is expressed by three-dimensional spherical coordinates using the position measurement device 2 as a reference.

As described above, the reference position measurement unit 21 acquires position information in the three-dimensional space of the reference reflective element 5 from the distance to the reference reflective element 5 measured by the reference distance measurement unit 210 and the irradiation direction of the reference measurement light measured by the reference irradiation direction measurement unit 212.

The position measurement process will be continuously described with reference back to FIG. 14.

The reference coordinate setting unit 260 provided in the calculation unit 26 sets a reference (origin) and a reference coordinate system on the basis of the first, second, and third reference position information acquired by the reference position measurement unit 21 and obtained via the control unit 22 (step S30). In the present embodiment, at least three reference position information items are acquired as the first to third reference position information and the reference coordinate setting unit 260 sets a desired Cartesian coordinate system (reference coordinate system) on the basis of the three reference position information items.

The reference coordinate system can be arbitrarily set in a space where the measurement target object (the reflective element 4) moves in accordance with installation positions of the first reference reflective element 5-1, the second reference reflective element 5-2, and the third reference reflective element 5-3. As a reference coordinate system, for example, as shown in FIG. 12, a Cartesian coordinate system can be set to include two axes parallel to a surface plate surface on which a measurement target object is placed with respect to a space where a movable unit C2, which is the measurement target object, moves. Further, the reference coordinate setting unit 260 sets a reference origin in the reference coordinate system. The origin may be any one of the three reference reflective elements, i.e., the first reference reflective element 5-1, the second reference reflective element 5-2, and the third reference reflective element 5-3 (reference positions).

Alternatively, the movable unit C2 (or the reflective element 4), which is the measurement target object, may be positioned at a predetermined position in the reference coordinate system, for example, at the origin of the movable unit C2 determined by the machine tool, and the position information of the reflective element 4 at that time may be caused to match the origin in the reference coordinate system. Thereby, the position information acquired by the position measurement unit 20 and the position information acquired by the reference position measurement unit 21 are the same position information with respect to the same position in the space and it is possible to eliminate (correct) the deviation between the position information acquired by the position measurement unit 20 and the position information acquired by the reference position measurement unit 21. In any case, there is no change in the reference coordinate system and the reference (origin) set on the basis of the reference position information obtained from the reference reflective element.

The first correction unit 261 provided in the calculation unit 26 converts the position information of the reflective element 4 into position information in the reference coordinate system (step S240). The first correction unit 261 converts the position information of the reflective element 4 measured by the position measurement unit 20 from the three-dimensional spherical coordinates using the position measurement device 2 as a reference into Cartesian coordinates in the reference coordinate system set by the reference coordinate setting unit 260. Thereby, in the space where the measurement target object moves, the position information of the measurement target object (i.e., the position information of the reflective element 4) can be acquired in Cartesian coordinates in the reference coordinate system.

The first correction unit 261 corrects the position information of the reflective element 4*c* using the reference position information of the reference reflective element 5 (step S250). The correction may include resetting the reference (origin) and the reference coordinate system set in step S230. For example, after the acquisition of the position information is started, an operation similar to that of step S230 may be performed at regular time intervals or irregularly to acquire the deviation in the reference coordinate system and correct the deviation. Thereby, it is possible to calibrate a change in the origin over time (origin calibration).

Alternatively, the reference position information of the reference reflective element 5 may be acquired all the time and changes in the reference (origin) and the reference coordinate system may be corrected all the time. In this case, changes (vibrations) in a short time can also be corrected.

Thus, it is possible to cancel (correct) a change in a relative positional relationship between the position measurement device 2 and the measurement target object (the reflective element 4) by installing the reference reflective element 5 on a measurement reference object serving as a reference for measuring the position of the measurement target object and setting the reference coordinate system and the origin on the basis of the reference position information of the reference reflective element 5 acquired by the position measurement device 2. In this sense, it can also be said that the conversion of the position information of the reflective element 4 into position information in the reference coordinate system executed by the first correction unit 261 is also the correction of the position information of the reflective element 4.

Here, as described above, the position information of the reflective element 4*c* is acquired by the position information acquisition unit. The first correction unit 261 calculates a displacement amount by which the current position of the movable position measurement device 1*c* for the reference position is displaced from the position of the movable position measurement device 1*c* for the reference position at the time of the origin calibration on the basis of the reference position information acquired by the reference position measurement unit 21. The first correction unit 261 corrects the position information of the reflective element 4*c* by the calculated displacement amount.

As described above, the position information of the reflective element 4*c* is measured on the basis of a light reception result of the light reception unit provided in the distance measurement unit 200. Therefore, the position information of the reflective element 4*c* corrected on the basis of the reference position information is the position information generated on the basis of the light reception result of the light reception unit provided in the distance measurement unit 200 and the reference position information. On the other hand, the reference position information is measured on the basis of the light reception result of the first reference light reception unit, the light reception result of the second reference light reception unit, and the light reception result of the third reference light reception unit. Therefore, in the movable position measurement device 1, the position information about the reference position of the reflective element 4*c* is generated on the basis of the light reception result of the light reception unit provided in the distance measurement unit 200, the light reception result of the first reference light reception unit, the light reception result of the second reference light reception unit, and the light reception result of the third reference light reception unit.

The relative positional relationship between the movable position measurement device 1*c* and the reference position may change due to vibrations in the floor, vibrations due to the movement of the robot, or the like. Even in this case, in the movable position measurement device 1*c*, the position information of the reflective element 4*c* can be corrected by the displacement amount of the relative position relationship for the reference position of the movable position measurement device 1*c*.

The control unit 22 transmits the corrected position information to the control system (step S260).

As described above, the control unit 22 ends the position measurement process.

The control system receives the corrected position information transmitted from the movable position measurement device 1*c*. The position of the measurement target in the measurement process of the movable position measurement device 1*c* indicated in the position information is the position of the control target of the control system. When the position of the control target indicated in the received position information deviates from the assumed position, the control system performs a calibration process so that the deviation between the position indicated in the received position information and the assumed position is canceled out. The assumed position is a position assumed in advance for the control system to control a control target such as a robot or a machine tool.

Alternatively, the control system may calculate a correction amount for controlling the control target on the basis of the received position information and perform a correction process on the basis of the calculated correction amount in the subsequent control. For example, the control system corrects a drive amount with a correction amount calculated on the basis of the position information in the control after receiving the position information.

Here, in the above-described process of capturing the image of the reference reflective element 5 (step S310), the movement device 3 may be moving. On the basis of the imaging result of the first imaging unit 23, the process of causing the reference measurement light irradiation unit 19 to irradiate the reference measurement light toward the reference reflective element 5 (step S320) is executed after the movement device 3 stops. Therefore, the process of radiating the reference measurement light toward the reference reflective element 5 (step S330) is executed after the movement device 3 stops. That is, the reference measurement light irradiation unit 19 irradiates the reference measurement light to the reference reflective element 5 after the movement device 3 stops. Also, the position measurement unit 20 generates information about the reference position after the movement device 3 stops.

Also, the position measurement device 2*c* may include a vibration detection unit 29 like the position measurement device 2*b* according to the third embodiment.

Like the position measurement device 2*b* according to the third embodiment, the vibration detection unit 29 detects vibrations of at least a part of the position measurement device 2*c*. The position measurement unit 20 generates information about a reference position on the basis of a detection result of the vibration detection unit 29. The reference measurement light irradiation unit 19 irradiates reference measurement light to the reference reflective element 5 on the basis of a detection result of the vibration detection unit 29. For example, the reference measurement light irradiation unit 19 irradiates reference measurement light to the reference reflective element 5 when the amount of vibration detected by the vibration detection unit 29 is smaller than a predetermined amount. In this case, the signal processing unit provided in the optical frequency comb interferometer 11 acquires information about the position of the reflective element 4*c* on the basis of the first reflected light of the first measurement light from the reflective element 4*c* when the amount of vibration detected by the vibration detection unit 29 is smaller than the predetermined amount and the reference reflected light of the reference measurement light from the reference reflective element 5. That is, when the vibration detection unit 29 is provided, the position measurement device 2*c* generates information about a reference position when the amount of vibration detected by the vibration detection unit is smaller than the predetermined amount. In addition, the imaging result of the first imaging unit 23 may be corrected on the basis of the detection result of the vibration detection unit 29.

As described above, the movable position measurement device 1*c* includes a reference position measurement unit 21 that acquires information about a reference position (reference position information) in the space where the robot is arranged.

The reference position measurement unit 21 includes a first reference irradiation unit, a second reference irradiation unit, a third reference irradiation unit, a first reference light reception unit, a second reference light reception unit, and a third reference light reception unit.

The first reference irradiation unit irradiates first reference measurement light to the first reference reflective element 5-1 relating to the reference position.

The second reference irradiation unit irradiates second reference measurement light to the second reference reflective element 5-2 relating to the reference position.

The third reference irradiation unit irradiates third reference measurement light to the third reference reflective element 5-3 relating to the reference position.

In the movable position measurement device 1, position information for the reference position of the first reflective element (the reflective element 4*c*) is generated on the basis of the light reception result of the first light reception unit (the light reception unit provided in the distance measurement unit 200), the light reception result of the first reference light reception unit, the light reception result of the second reference light reception unit, and the light reception result of the third reference light reception unit.

Although an example in which the movable position measurement device 1*c* includes three irradiation units (the first reference irradiation unit, the second reference irradiation unit, and the third reference irradiation unit), three light reception units (the first reference light reception unit, the second reference light reception unit, and the third reference light reception unit), and three reference reflective elements (the first reference reflective element 5-1, the second reference reflective element 5-2, and the third reference reflective element 5-3) to generate reference position information (i.e., to measure a reference position) has been described in the present embodiment, the present invention is not limited thereto. Hereinafter, an example of another configuration for generating reference position information will be described.

In the present embodiment, the reference measurement light irradiation unit 19 can simultaneously irradiate three reference measurement light beams. In addition, the reference measurement light irradiation unit 19 may sequentially irradiate the three reference measurement light beams instead of simultaneously radiating the three reference measurement light beams.

Also, instead of radiating three reference measurement light beams, one reference measurement light beam may be sequentially irradiated to each of the three reference reflective elements.

In this case, the reference position measurement unit 21 includes a reference irradiation unit and a reference light reception unit.

The reference irradiation unit irradiates reference measurement light to the first reference reflective element, the second reference reflective element, and the third reference reflective element relating to the reference position.

The reference light reception unit receives the first reference reflected light from the first reference reflective element, the second reference reflected light from the second reference reflective element, and the third reference reflected light from the third reference reflective element.

On the basis of the light reception result of the first light reception unit (the light reception unit provided in the distance measurement unit 200) and the light reception result of the reference light reception unit, position information is generated for the reference position of the first reflective element (the reflective element 4*c*).

The position measurement device 2*c* may include three reference irradiation units and one reference light reception unit.

In this case, the reference position measurement unit 21 includes a first reference irradiation unit, a second reference irradiation unit, a third reference irradiation unit, and a reference light reception unit.

The first reference irradiation unit irradiates the first reference measurement light to the first reference reflective element 5-1 relating to the reference position. The second reference irradiation unit irradiates the second reference measurement light to the second reference reflective element 5-2 relating to the reference position.

The third reference irradiation unit irradiates the third reference measurement light to the third reference reflective element 5-3 relating to the reference position.

The reference light reception unit receives the first reference reflected light from the first reference reflective element 5-1, the second reference reflected light from the second reference reflective element 5-2, and the third reference reflected light from the third reference reflective element 5-3.

On the basis of the light reception result of the first light reception unit (the light reception unit provided in the distance measurement unit 200) and the light reception result of the reference light reception unit, position information is generated for the reference position of the first reflective element (the reflective element 4*c*).

Although an example in which the number of reference reflective elements 5 is three has been described in the present embodiment, the present invention is not limited thereto. The number of reference reflective elements 5 may be four or more.

In order for the movable position measurement device 1*c* to measure the displacement of the movable position measurement device 1*c* for the reference position, it is only necessary for the number of reference reflective elements 5 to be one. The number of reference reflective element 5 may be two.

For example, when the number of reference reflective elements 5 is one, the reference position measurement unit 21 includes a reference irradiation unit and a reference light reception unit.

The reference irradiation unit irradiates reference measurement light to a reference reflective element provided at a reference position.

The reference light reception unit receives the reference reflected light from the reference reflective element.

On the basis of the light reception result of the first light reception unit (the light reception unit provided in the distance measurement unit 200) and the light reception result of the reference light reception unit, position information is generated for the reference position of the first reflective element (the reflective element 4*c*).

Although an example in which the movable position measurement device 1*c* is irradiated with reference measurement light for measuring a reference position separately from the measurement light for measuring the position of the reflective element 4*c* has been described in the present embodiment, the present invention is not limited thereto. The measurement light for measuring the position of the reflective element 4*c* may be used as the reference measurement light.

In this case, the irradiation direction movement unit 201 adjusts the irradiation direction so that the measurement light is directed toward the reference reflective element relating to the reference position.

The light reception unit provided in the distance measurement unit 200 receives reference reflected light from the reference reflective element.

The position measurement unit 20 generates position information for the reference position of the reflective element 4*c* on the basis of the light reception result of the light reception unit provided in the distance measurement unit 200.

Also, when the measurement light for measuring the position of the reflective element 4*c* is used as the reference measurement light, the irradiation unit provided in the optical frequency comb interferometer 11 is moved by the movement device 3, irradiates measurement light to the reference reflective element 5 relating to the reference position in the space where the movement device 3 is arranged, and irradiates the measurement light to the reflective element 4*c* provided on the measurement target object. The signal processing unit provided in the optical frequency comb interferometer 11 acquires position information or distance information about the reflective element 4*c* for the reference position on the basis of the first reflected light of the measurement light from the reflective element 4*c* and the reference reflected light of the measurement light from the reference reflective element 5.

In addition, in the case where the number of reference reflective elements 5 is N, when the number of reference measurement light beams irradiated from the reference irradiation unit is X and the number of measurement light beams irradiated from the irradiation unit of the optical frequency comb interferometer 11 and used as the reference measurement light is Y, it is possible to perform a measurement process similar to that of the movable position measurement device 1*c* according to the present embodiment in various combinations as long as a condition in which a sum of the number X and the number Y is equal to the number N is satisfied.

Although an example in which the reference position information is used for correction of position information indicating the position of the reflective element 4 has been described in the present embodiment, the present invention is not limited thereto. For example, the reference position information may be used to determine a movement path of the movable position measurement device 1*c*. Also, when the movable position measurement device 1*c* moves using well-known simultaneous localization and mapping (SLAM), the reference position information may be used to confirm whether the movable position measurement device 1*c* is moving along the path indicated in the SLAM.

Fifth Embodiment

Hereinafter, a fifth embodiment of the present invention will be described in detail with reference to the drawings.

In the present embodiment, a case where a movable position measurement device 1*d* holds a reflective element for installation on a robot, which is a measurement target, will be described.

A movable position measurement device according to the present embodiment is referred to as the movable position measurement device 1*d* and a movement device is referred to as a movement device 3*d*.

In addition, components identical to those of the above-described embodiments may be denoted by the same reference signs and description of the same components and operations may be omitted.

Figure 16:
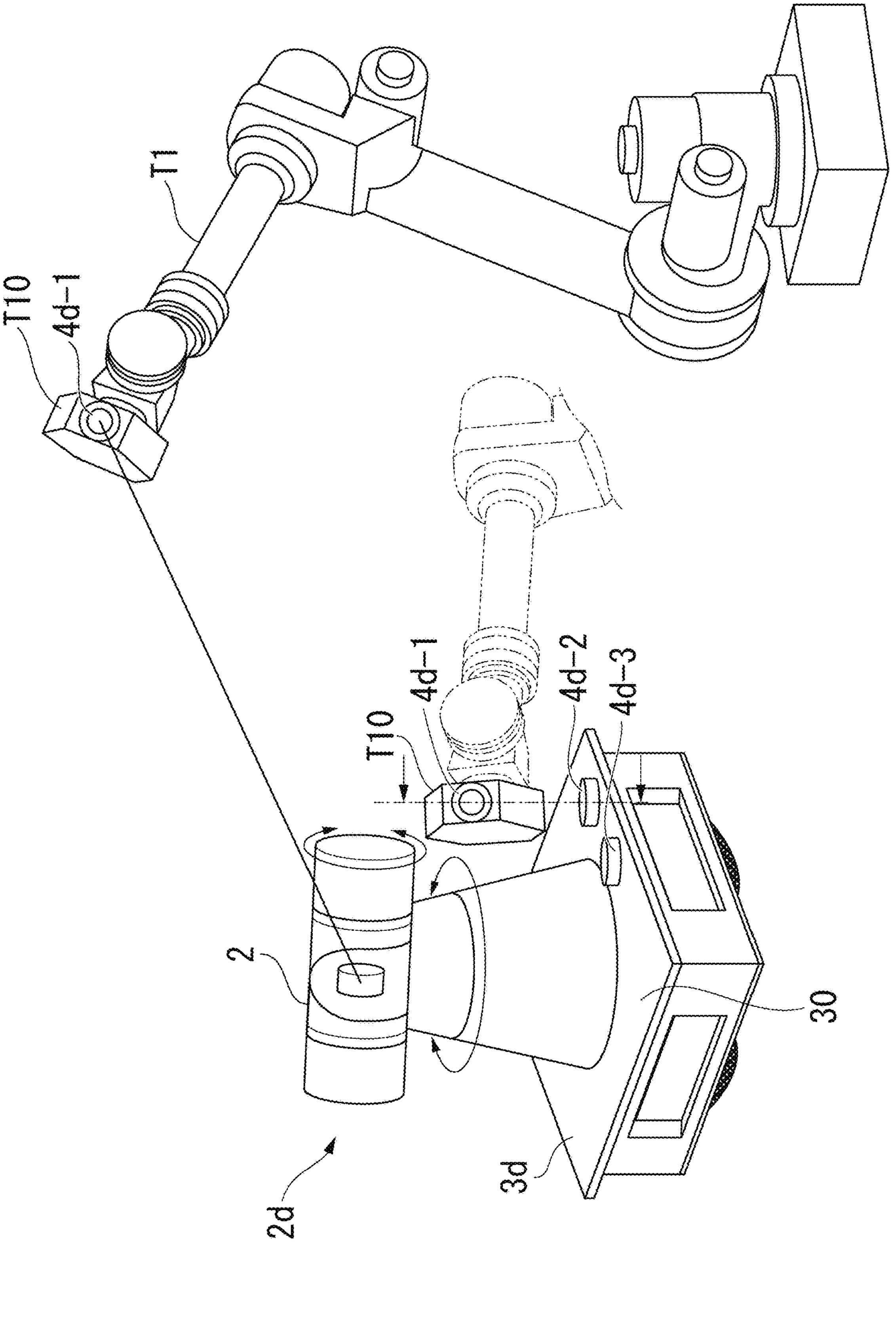
FIG. 16 is a diagram showing an example of a state of an operation of a movable position measurement device according to a fifth embodiment.

FIG. 16 is a diagram showing an example of a state of the operation of the movable position measurement device 1*d* according to the present embodiment. The movable position measurement device 1*d* includes a position measurement device 2 and a movement device 3*d*. A robot T1 is an arm-type robot and is an example of a measurement target.

The movement device 3*d* includes a holding unit 30. The holding unit 30 removably holds a reflective element 4*d*. The holding unit 30 is provided in the movement device 3*d*. The holding unit 30 has a groove (not shown) for removably holding the reflective element 4*d*. The groove is shaped according to the shape of the holder T10 that holds the reflective element 4*d*. In FIG. 16, a state in which a reflective element 4*d*-2 and a reflective element 4*d*-3 are held as the reflective element 4*d* in the holding unit 30 is shown.

A holder T10 is provided at the tip of the arm of the robot T1. The holder T10 holds the reflective element 4*d*. The reflective element 4*d* is detachable from the holder T10. In FIG. 16, a state in which the reflective element 4*d*-1 is held in the holder T10 as an example of the reflective element 4*d* is shown. The holder T10 is an example of a holding unit that holds a reflective element provided in the robot.

Figure 17:
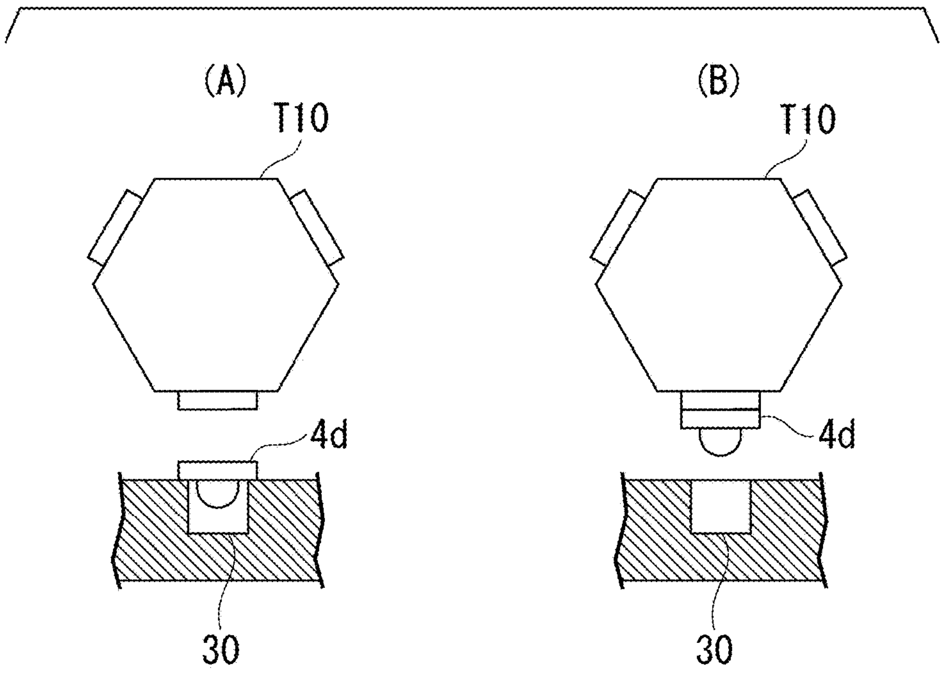
FIG. 17 is a diagram showing an example of a state in which a reflective element is attached to and detached from a holder according to the fifth embodiment.

FIG. 17 is a diagram showing an example of a state in which the reflective element 4*d* according to the present embodiment is attached to and detached from the holder T10. In FIG. 17(A), the reflective element 4*d* is held in the groove of the holding unit 30. Here, as an example, the reflective element 4*d* is held in the holding unit 30 with the reflective element on the lower side.

In FIG. 17(B), the reflective element 4*d* is held in the holder T10. The robot T1 causes the tip part of the arm provided with the holder T10 to be close to the holding unit 30 of the movement device 3*d* and causes the holder T10 to hold the reflective element 4*d*.

The shape of the holder T10 is, as an example, a columnar body having a regular hexagonal base. The reflective element 4*d* can be installed, for example, at three locations on the side of the columnar body. In addition, a base surface of the columnar body may be a polygonal surface shape other than a hexagon, a round, an oval surface shape, or another surface shape. In the present embodiment, the bottom part of the holder T10 is the base surface, but may be a spherical surface or another three-dimensional shape.

At the time of measurement, it is only necessary for one or more reflective elements 4*d* to be installed in the holder T10. In the measurement, it is only necessary for the movable position measurement device 1*d* to measure the position of any one of the three reflective elements 4*d* installed on the three side sides of the holder T10.

In order for the reflective element 4*d* to be arranged at a position where the movable position measurement device 1*d* can irradiate the measurement light, it is preferable that the number of reflective elements 4*d* installed in the holder T10 be large. Because the shape of the holder T10 is a columnar body having a regular hexagonal base as described above, the irradiation unit provided in the optical frequency comb interferometer 11 can irradiate measurement light from any direction at a 360-degree angle around the holder T10 as shown in FIG. 17.

Also, the plurality of reflective elements 4*d* may include a plurality of types of reflective elements. The plurality of types are, for example, a material, a size, a structure, and the like of the reflective element. An example of a plurality of structures may be a structure obtained by combining planar mirrors and a spherical-like structure.

Also, an identifier may be assigned to each of the plurality of reflective elements 4*d*. According to the identifier, the movable position measurement device 1*d* can identify which of the plurality of reflective elements 4*d* is installed in the holder T10 provided in the robot T1 or is held in the holding unit 30 of the movable position measurement device 1*d*.

Because the reflective element 4*d* is not required in a case other than the case of position measurement, it is not necessary to be installed in the robot T1 all the time. When the reflective element 4*d* is installed on the robot T1 all the time, the surface of the reflective element 4*d* may become dirty. Dirt on the surface of the reflective element 4*d* can be an error factor in position measurement using measurement light.

In the movable position measurement device 1*d*, the reflective element 4*d* is held in the holding unit 30 of the movable position measurement device 1*d* except for the time of measurement and the reflective element 4*d* can be installed on the robot T1 only at the time of measurement, so that the risk of contamination of the surface of the reflective element 4*d* can be reduced. In addition, the holding unit 30 may include a function of cleaning the reflective element 4*d* in a state in which the reflective element 4*d* is held.

Sixth Embodiment

Hereinafter, a sixth embodiment of the present invention will be described in detail with reference to the drawings.

In the present embodiment, a case where the movable position measurement device controls a control system of a robot or a machine tool of a measurement target on the basis of the measurement result will be described.

A movable position measurement device according to the present embodiment is referred to as a movable position measurement device 1*e* and a position measurement device is referred to as a position measurement device 2*e*.

Figure 18:
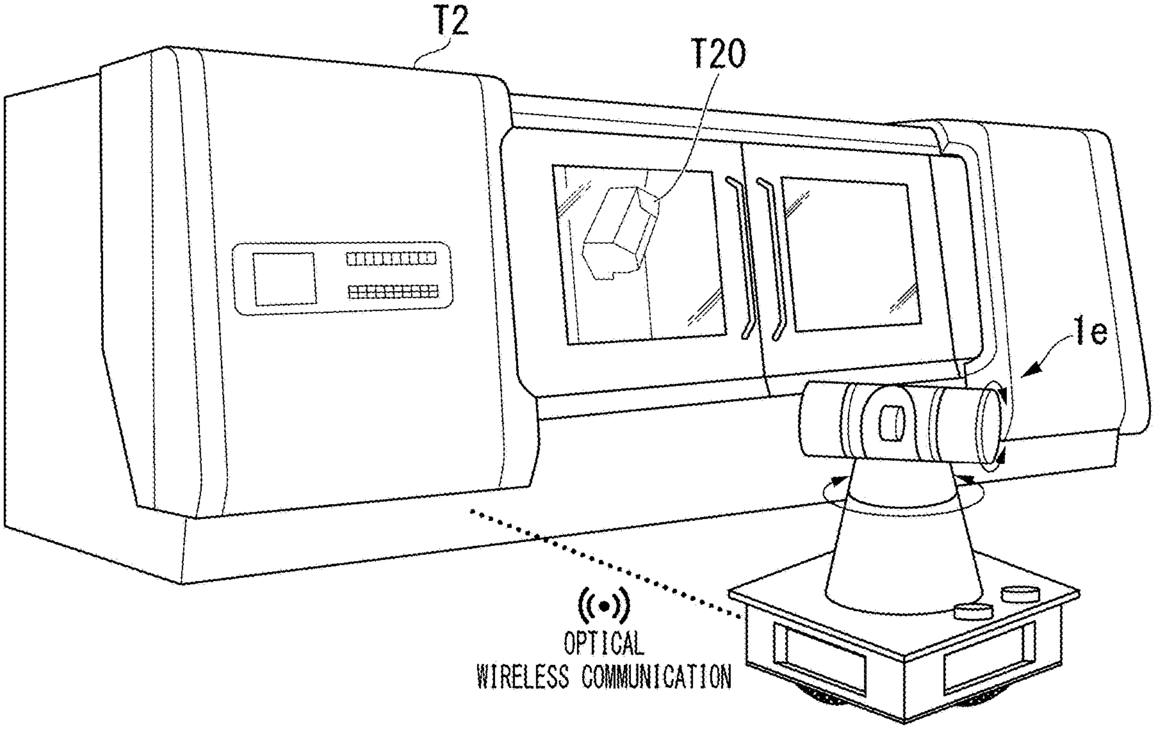
FIG. 18 is a diagram showing an example of a state in which a movable position measurement device according to a sixth embodiment controls a control system.

FIG. 18 is a diagram showing an example of a state in which the movable position measurement device 1*e* according to the present embodiment controls a machine tool T2.

The machine tool T2 controls a spindle T20 provided in the machine tool T2. The spindle T20 is provided inside of the machine tool T2. The spindle T20 is a shaft for attaching a rotation target to the shaft end and rotating the rotation target in the machine tool T2. Examples of the rotation target include blades, rotary whetstones, and the like. In the machine tool T2, a window is provided in a form in which the inside of the machine tool T2 can be monitored from the outside.

The spindle T20 is provided inside of the machine tool T2. A reflective element is provided on the spindle T20. That is, the reflective element is arranged inside of the machine tool T2. The reflective element is arranged on, for example, an upper part of the spindle T20.

The movable position measurement device 1*e* transmits the measurement light through the window of the machine tool T2 and irradiates the measurement light to the reflective element installed on the spindle T20. The movable position measurement device 1*e* receives reflected light transmitted through the window of the machine tool T2 from the reflective element. The window of the machine tool T2 is preferably made of a shape and material (a refractive index or transmittance) in which the measurement light and the reflected light are sufficiently transmitted and the refraction of the measurement light and the reflected light is less than or equal to a predetermined degree.

The movable position measurement device 1*e* communicates with the machine tool T2 through optical wireless communication. The movable position measurement device 1*e* transmits the measured position information to the machine tool T2 through the optical wireless communication. In the movable position measurement device 1*e*, the communication unit 25 includes a communication module for performing the optical wireless communication.

In addition, the movable position measurement device 1*e* may correct the measured position information on the basis of the optical characteristics (a refractive index, transmittance, and the like) of the window of the machine tool T2. Also, the movable position measurement device 1*e* may calculate the position information on the basis of the optical characteristics of the window of the machine tool T2 in the process of calculating the position information. The movable position measurement device 1*e* acquires information indicating the optical characteristics of the window of the machine tool T2 in advance by communicating with the machine tool T2.

The machine tool T2 uses position information of the spindle T20 measured by the movable position measurement device 1*e* in calibration for processing the spindle T20. When the machine tool T2 receives the position information from the movable position measurement device 1*e*, the machine tool T2 immediately performs calibration on the basis of the position information. The machine tool T2 includes a position measurement device for measuring the position of the spindle T20. In the calibration, the machine tool T2 outputs the position of the spindle T20 indicated in the position information received from the movable position measurement device 1*e* to the position measurement device.

In addition, when the control unit 22 of the movable position measurement device 1*e* and the control unit of the machine tool T2 are compatible, the movable position measurement device 1*e* may control the machine tool T2 on the basis of a measurement result. In this case, the movable position measurement device 1*e* controls the spindle T20 instead of the machine tool T2. The movable position measurement device 1*e* functions as a position measurement device provided outside of the machine tool T2. The movable position measurement device 1*e* immediately executes a calibration process for the position of the spindle T20 in the processing of the spindle T20 as the position measurement device provided outside of the machine tool T2.

In addition, when the movable position measurement device 1*e* controls the machine tool T2, even if the machine tool T2 does not have a function of performing calibration on the basis of highly accurate position information in the movable position measurement device 1*e*, the calibration of the spindle T20 can be performed on the basis of the position information with high accuracy.

Also, the movable position measurement device 1*e* may control a position of the processing head of the laser processing device with high accuracy.

Also, the movable position measurement device 1*e* may measure position information and/or control the processing head in a state in which the window of the machine tool T2 is open.

Seventh Embodiment

Hereinafter, a seventh embodiment of the present invention will be described in detail with reference to the drawings.

In the present embodiment, a case where a movable position measurement device controls a host computer that controls a factory facility will be described. The movable position measurement device according to the present embodiment is referred to as a movable position measurement device 1*f*, and a position measurement device is referred to as a position measurement device 2*f*. The movable position measurement device 1*f* includes, for example, a configuration of the movable position measurement device 1*c* described above and a configuration of the movable position measurement device 1*d*.

Figure 19:
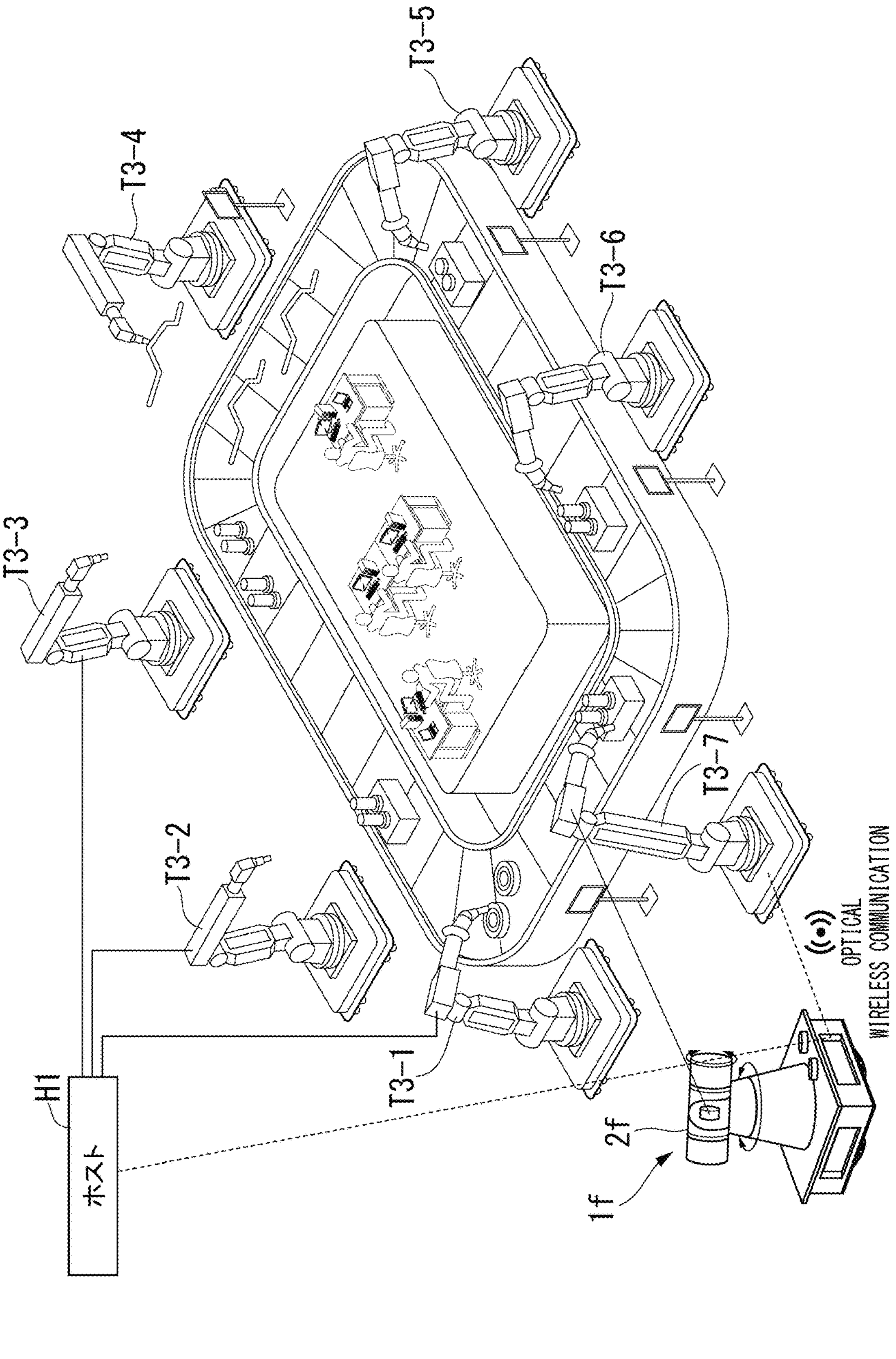
FIG. 19 is a diagram showing an example of a state in which a movable position measurement device according to a seventh embodiment controls a plurality of robots.

FIG. 19 is a diagram showing an example of a state in which the movable position measurement device 1*f* according to the present embodiment controls a plurality of robots T3. The movable position measurement device 1*f* and the plurality of robots T3 can be installed in the factory facility. The movable position measurement device 1*f* can be moved freely through the factory facility. In the example shown in FIG. 19, seven robots T3-1 to T3-7 are shown as the plurality of robots T3. The factory facility is controlled by a host computer H1. The host computer H1 is an example of a control system of the plurality of robots T3.

The movable position measurement device 1*f* measures position information for each of the plurality of robots T3. The movable position measurement device 1*f* sequentially performs measurement while changing the robot T3 serving as the measurement target. In the factory facility, the movable position measurement device 1*f* moves to a position where the measurement light can be irradiated to the reflective element currently installed in the robot T3 serving as the measurement target among the plurality of robots T3 and performs measurement after stopping.

The movable position measurement device 1*f* measures, for example, the plurality of robots T3 on the basis of a predetermined sequence. The predetermined sequence is, for example, a sequence based on the position where the plurality of robots T3 are arranged in a factory facility. The predetermined sequence may be a sequence predetermined by the host computer H1.

In addition, the movable position measurement device 1*f* may measure a plurality of robots T3 without being based on the predetermined sequence. For example, the movable position measurement device 1*f* may image a 360-degree range around the movable position measurement device 1*f* in the second imaging unit 28 and the imaged robot T3 may be used as the measurement target on the basis of an imaging result.

When the position information is measured, the movable position measurement device 1*f* sequentially transmits the position information to the host computer H1. The movable position measurement device 1*f* may collectively transmit the position information for each of the plurality of robots T3 to the host computer H1.

Also, the movable position measurement device 1*f* transmits the adjustment information of the robot T3 based on the position information to the host computer H1. The adjustment information includes a control signal for controlling the robot T3. The control signal includes, for example, a signal for controlling a manipulation target to be manipulated by the robot T3 or a position of a processing target to be processed by the robot T3. Also, the control signal may include both a signal for controlling the manipulation target to be manipulated by the robot T3 and a signal for controlling the position of the processing target to be processed by the robot T3. Also, the control signal includes a signal for controlling the position and movement of a plurality of robots T3. The signal can control the plurality of robots T3 to avoid contact between the plurality of robots T3.

As described above, in the present embodiment, the movable position measurement device 1*f* generates adjustment information about a first measurement target on the basis of position information about the first measurement target. In addition, the movable position measurement device 1*f* may generate adjustment information about a second measurement target different from the first measurement target on the basis of the position information about the first measurement target. The second measurement target is, for example, a measurement target arranged within a predetermined range from the position where the first measurement target is arranged.

For example, the movable position measurement device 1*f* controls the robot T3-2 or the robot T3-7 arranged in a predetermined range from the robot T3-1 on the basis of the position information of the robot T3-1.

The movable position measurement device 1*f* transmits adjustment information to the host computer H1 through wireless communication. The wireless communication may be optical wireless communication. In the movable position measurement device 1*f*, it is possible to communicate with the host computer H1 without mixing with other wireless communications by using optical wireless communication.

When the adjustment information is received from the movable position measurement device 1*f*, the host computer H1 controls the plurality of robots T3 on the basis of the received adjustment information. As an example, the control based on the adjustment information includes control in which the robot T3 indicates a target position of the processing target to be processed. When the position of the processing target indicated in the position information of the processing target deviates from the assumed position, the position information of the processing target may be corrected by the deviation on the basis of the adjustment information. Alternatively, on the basis of the adjustment information, the position indicated in the position information of the processing target may be calculated (converted) as an initial position and the position of the processing target may be calculated (converted) as a relative position from the initial position.

Therefore, the movable position measurement device 1*f* can control the plurality of robots T3 via the host computer H1 by transmitting adjustment information to the host computer H1. That is, the movable position measurement device 1*f* functions as a movable control device (a mobile controller) that transmits commands from a higher level to the plurality of robots T3 arranged in the factory.

In addition, the movable position measurement device 1*f* transmits any one or more items of the position information and the adjustment information to the host computer H1.

Also, the movable position measurement device 1*f* may transmit the position information to the host computer H1 to generate adjustment information on the basis of the position information received by the host computer H1 from the movable position measurement device 1*f*.

Also, the movable position measurement device 1*f* may directly control the plurality of robots T3 on the basis of the adjustment information without involving the host computer H1.

Also, the position measurement unit 20 provided in the position measurement device 2*f* acquires information about the coordinate system in the space where the robot T3 is arranged from the host computer H1. Alternatively, information about the coordinate system may be stored in a storage medium in the movable position measurement device 1*f* and the information about the coordinate system may be read and acquired by the position measurement unit 20. The position measurement unit 20 generates coordinate position information of the robot T3 in the coordinate system on the basis of the information about the coordinate system. The coordinate system is a coordinate system serving as a reference in the factory where the robot T3 is arranged. Therefore, the movable position measurement device 1*f* can control the plurality of robots T3 on the basis of a highly accurate coordinate system.

Although an example in which a movable position measurement device 1*f*, which can freely move in a factory facility, is provided has been described in the present embodiment, the present invention is not limited thereto.

The movable position measurement device 1*f* may be used in a position measurement system including a plurality of movable position measurement devices 1*f*.

Also, a plurality (N) of movable position measurement devices 1*f* may be provided in the factory facility. M robots may be controlled by the N movable position measurement devices 1*f*. In this case, each of the plurality of movable position measurement devices 1*f* measures a position to the reflective element with respect to one or more of the reflective elements provided in one of the plurality of robots. Here, the number N may be larger than the number M, the number N may be smaller than the number M, and the number N may be equal to the number M. The number N or the number M may be 1.

A plurality of stationary position measurement devices 2 may be provided together with the plurality of movable position measurement devices 1*f*.

Although an example in which the control system is the host computer H1 that manages and controls the entire factory facility has been described in the present embodiment, the present invention is not limited thereto.

The control system may be a local server that manages and controls a range of a part of the factory facility, a server that manages and controls some of a plurality of robots arranged in the factory facility, a central processing unit (CPU) that manages and controls one robot, or the like.

In addition, the position measurement device 2*f* may include a second imaging unit 28 like the position measurement device 2*a* according to the second embodiment described above. In this case, a position at which the movable position measurement device 1*f* stops may be determined on the basis of an imaging result of the second imaging unit 28. In the factory, the movable position measurement device 1*f* moves to a measurement position that is a position for measuring the position of the measurement target. The control unit 22 images a measurement target in advance in the second imaging unit 28 in a period before the measurement starts and determines a measurement position on the basis of the imaging result of the second imaging unit 28. When the movable position measurement device 1*f* moves to the determined measurement position in the factory, it stops at the measurement position. In this case, the control unit 22 may determine the measurement position in a state in which the movable position measurement device 1*f* is stopped in a period before the measurement starts or may determine the measurement position in a state in which the movable position measurement device 1*f* is moving.

Also, for example, when it is determined that the position of the measurement target is far from the position of the movable position measurement device 1*f* on the basis of the imaging result of the second imaging unit 28, the movable position measurement device 1*f* first moves closer to the measurement target. At that time, the movable position measurement device 1*f* moves while changing the direction of the movable position measurement device 1*f* itself so that the direction of the movable position measurement device 1*f* itself is a direction in which it is easy to measure the measurement target. The direction in which it is easy to measure the measurement target is, for example, a direction in which the reflective element 4 can be seen from the front. For example, the movable position measurement device 1*f* determines an image of the front of the reflective element 4 on the basis of image recognition and determines the direction in which the reflective element 4 can be seen from the front. The movable position measurement device 1*f* may determine an imaging direction of the second imaging unit 28 in which an area of an image of the reflective element 4 is maximized in the image captured by the second imaging unit 28 as the direction in which the reflective element 4 can be seen from the front.

Eighth Embodiment

Hereinafter, an eighth embodiment of the present invention will be described in detail with reference to the drawings.

The movable position measurement device has been described with respect to a case where position information is measured with respect to a robot or a machine tool that processes a workpiece in each of the above-described embodiments. In the present embodiment, a case where the movable position measurement device 1 is used to measure position information in a process of assembling parts will be described.

Figure 20:
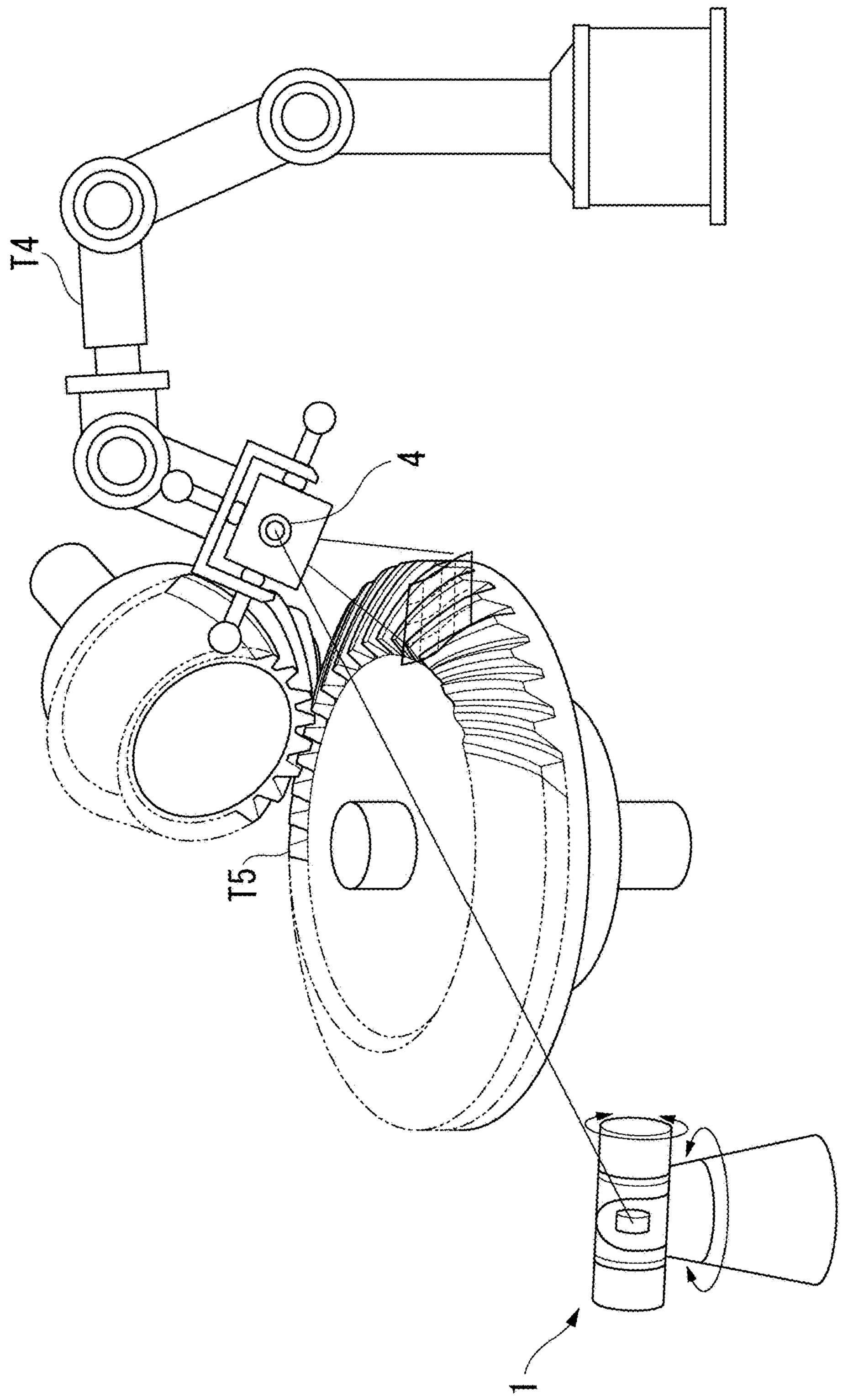
FIG. 20 is a diagram showing an example of a state in which a position measurement device according to an eighth embodiment measures position information of an optical scanner.

FIG. 20 is a diagram showing an example of a state in which the movable position measurement device 1 according to the present embodiment measures position information of an optical scanner T4. The optical scanner T4 is a coordinate measuring machine (CMM) that three-dimensionally measures a shape of a target according to irradiated light. In FIG. 20, the optical scanner T4 measures the shape of an assembly component T5. The optical scanner T4 has an arm-like form and irradiates illumination light to the assembly component T5 from the tip part of the arm.

The reflective element 4 is installed at the tip of the arm of the optical scanner T4. The movable position measurement device 1 measures the position information of the reflective element 4 installed in the optical scanner T4. The movable position measurement device 1 transmits the measured position information to the control system of the optical scanner T4. The control system of the optical scanner T4 corrects a result of measuring the shape of the optical scanner T4 on the basis of the position information measured by the movable position measurement device 1.

In addition, the CMM to be measured by the movable position measurement device 1 is not limited to the optical scanner T4. The movable position measurement device 1 may be used to assist in the measurement of the stationary CMM. In this case, the movable position measurement device 1 may be installed in a part of the stationary CMM. For example, the movable position measurement device 1 may be installed on the ceiling of the stationary CMM. The movable position measurement device 1 installed on the ceiling measures the position information of the reflective element 4 installed in the measurement unit of the stationary CMM.

Ninth Embodiment

Hereinafter, a ninth embodiment of the present invention will be described in detail with reference to the drawings.

In the present embodiment, a case where the movable position measurement device 1 is used to measure position information in a step of assembling a large machine and a step in which processing steps are performed in parallel will be described.

In the present embodiment, a case where the movable position measurement device 1 provided in the movable position measurement device 1 according to the first embodiment described above is used will be described.

Figure 21:
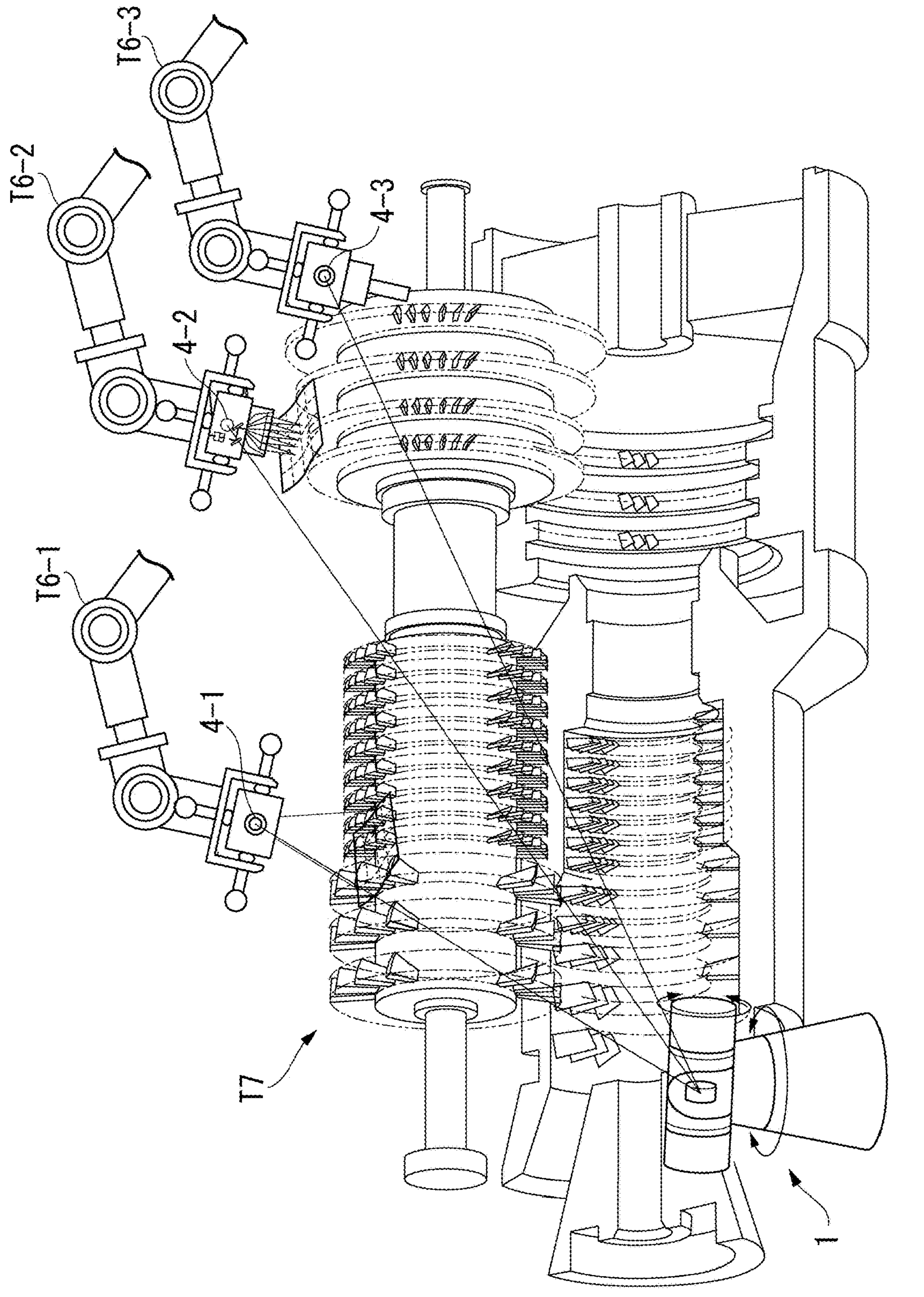
FIG. 21 is a diagram showing an example of a state in which a position measurement device according to a ninth embodiment measures position information in a step of assembling and processing a turbine.

FIG. 21 is a diagram showing an example of a state in which the movable position measurement device 1 according to the present embodiment measures position information in a step of assembling and processing a turbine T7. The optical scanner T6-1 is a CMM that three-dimensionally measures the shape of the turbine T7. An optical processing machine T6-2 processes parts such as the blades of the turbine T7 in a process of radiating light. A cutting machine T6-3 processes parts such as the blades of the turbine T7 in a cutting process. A reflective element 4-1, a reflective element 4-2, and a reflective element 4-3 are installed in the optical scanner T6-1, the optical processing machine T6-2, and the cutting machine T6-3, respectively.

The movable position measurement device 1 measures position information for each of the reflective element 4-1, the reflective element 4-2, and the reflective element 4-3. The movable position measurement device 1 transmits the measured position information to the control system that controls the optical scanner T6-1, the optical processing machine T6-2, and the cutting machine T6-3.

On the basis of the position information measured by the movable position measurement device 1, it is possible to measure the accuracy of assembly with high accuracy in a step in which a step of assembling parts of a large machine such as the turbine T7 and a processing step are performed in parallel.

Although the movable position measurement device 1 has been described in the above-described embodiment, the present invention is not limited to an example for use in the machine assembly step. The movable position measurement device 1 may be used to measure position information in the steps (overhaul) of disassembling, cleaning, and reassembling the assembled machine.

As described above, a position measurement device according to an embodiment (the movable position measurement device 1, 1*a*, 1*b*, 1*c*, 1*d*, 1*e*, or 1*f* in the above-described embodiment) includes the movement device 3 capable of movement; the position measurement unit 20 including an irradiation unit configured to irradiate measurement light to the reflective element 4 or 4*c* arranged on a movable unit of a robot, a light reception unit configured to receive reflected light from the reflective element 4 or 4*c*, a position information acquisition unit configured to acquire position information of the reflective element 4 or 4*c*, and a movement unit (the irradiation direction movement unit 201 in the embodiment) configured to change an irradiation direction of the measurement light; an imaging unit (the first imaging unit 23 in the embodiment); and a transmission unit configured to transmit the position information acquired by the position measurement unit 20 or adjustment information of the robot based on the position information to a control system of the robot.

The movement device 3 moves at least one of the irradiation unit, the light reception unit, the movement unit (the irradiation direction movement unit 201 in the embodiment), and the imaging unit (the first imaging unit 23 in the embodiment).

The position measurement device (the movable position measurement device 1, 1*a*, 1*b*, 1*c*, 1*d*, 1*e*, or 1*f* in the above-described embodiment) controls the movement unit (the irradiation direction movement unit 201 in the embodiment) so that one or both of at least a part of the robot and the reflective element 4 or 4*c* are imaged using the imaging unit (the first imaging unit 23 in the embodiment) and the measurement light is irradiated to the reflective element 4 or 4*c* on the basis of an imaging result of the imaging unit (the first imaging unit 23 in the embodiment).

According to this configuration, in the position measurement device according to the embodiment (the movable position measurement device 1, 1*a*, 1*b*, 1*c*, 1*d*, 1*e*, or 1*f* in the above-described embodiment), the position of the robot can be measured with high accuracy in the control of the robot because the movement unit (the irradiation direction movement unit 201 in the embodiment) can be controlled so that one or both of at least a part of the robot and the reflective element 4 or 4*c* are imaged using the imaging unit (the first imaging unit 23 in the embodiment) and the measurement light is irradiated to the reflective element 4 or 4*c* on the basis of an imaging result thereof.

Also, a position measurement device according to the embodiment (the movable position measurement device 1, 1*a*, 1*b*, 1*c*, 1*d*, 1*e*, or 1*f* in the above-described embodiment) includes the movement device 3 capable of movement; an irradiation unit provided on a movable unit of a robot and configured to irradiate measurement light to a reflective element 4 or 4*c*; a light reception unit arranged on the movement device 3 and configured to receive reflected light from the reflective element 4 or 4*c*; and a measurement unit (a signal processing unit of the optical frequency comb interferometer 11 in the present embodiment) configured to acquire position information or distance information about the reflective element 4 or 4*c* on the basis of a light reception result of the light reception unit.

According to this configuration, in the position measurement device according to the embodiment (the movable position measurement device 1, 1*a*, 1*b*, 1*c*, 1*d*, 1*e*, or 1*f* in the above-described embodiment), it is possible to measure a position of a measurement target or a distance from a measurement device (the movable position measurement device 1, 1*a*, 1*b*, 1*c*, 1*d*, 1*e*, or 1*f* in the above-described embodiment) with high accuracy because it is possible to acquire position information or distance information about the reflective element 4 or 4*c* on the basis of the light reception result of the light reception unit.

Also, a measurement device according to the embodiment (the movable position measurement device 1*c* in the above-described embodiment) includes the movement device 3 capable of movement; a first irradiation unit provided in the movement device 3 and configured to irradiate first measurement light to a first reflective element (the reflective element 4*c* in the embodiment) provided on a measurement target object; a reference irradiation unit (the reference measurement light irradiation unit 19 in the embodiment) provided in the movement device 3 and configured to irradiate reference measurement light to the reference reflective element 5 relating to a reference position in a space where the movement device 3 is arranged; and a measurement unit (a signal processing unit of the optical frequency comb interferometer 11 in the embodiment) configured to acquire position information or distance information about the first reflective element (the reflective element 4*c* in the embodiment) for the reference position on the basis of first reflected light of the first measurement light from the first reflective element (the reflective element 4*c* in the embodiment) and reference reflected light of the reference measurement light from the reference reflective element 5.

According to this configuration, the measurement device according to the embodiment (the movable position measurement device 1*c* in the above-described embodiment) can measure a position of a measurement target object or a distance from the measurement device (the movable position measurement device 1*c* in the above-described embodiment) with high accuracy even if the reference position is not acquired in advance because the position information or the distance information about the first reflective element (the reflective element 4*c* in the embodiment) for the reference position can be acquired on the basis of the first reflected light of the first measurement light from the first reflective element (the reflective element 4*c* in the embodiment) and the reference reflected light of the reference measurement light from the reference reflective element 5 even if the reference position is not acquired in advance.

Also, a measurement device according to the embodiment (the movable position measurement device 1*c* in the above-described embodiment) includes the movement device 3 capable of movement; an irradiation unit provided in the movement device 3 and configured to irradiate measurement light to the reference reflective element 5 relating to a reference position in a space where the movement device 3 is arranged and irradiate measurement light to a first reflective element (the reflective element 4*c* in the embodiment) provided in a measurement target object; and a measurement unit (a signal processing unit of the optical frequency comb interferometer 11 in the embodiment) configured to acquire position information or distance information about the first reflective element (the reflective element 4*c* in the embodiment) for the reference position on the basis of first reflected light of the measurement light from the first reflective element (the reflective element 4*c* in the embodiment) and reference reflected light of the measurement light from the reference reflective element 5.

According to this configuration, the measurement device according to the embodiment (the movable position measurement device 1*c* in the above-described embodiment) can measure a position of a measurement target object or a distance from the measurement device (the movable position measurement device 1*c* in the above-described embodiment)

with high accuracy even if the reference position is not acquired in advance according to a simple configuration without separately providing a reference irradiation unit for radiating reference measurement light because the measurement light for use in the acquisition of the position information or the distance information about the first reflective element (the reflective element 4*c* in the embodiment) can be used to measure the reference position.

Although an example in which each of the movable position measurement devices 1, 1*a*, 1*b*, 1*c*, 1*d*, 1*e*, and 1*f* in the above-described embodiment includes the optical frequency comb interferometer 11 has been described, the present invention is not limited thereto. Each of the movable position measurement devices 1, 1*a*, 1*b*, 1*c*, 1*d*, 1*e*, and 1*f* may measure the position of the measurement target on the basis of a distance measurement method other than the optical frequency comb method.

The ranging method used by each of the movable position measurement devices 1, 1*a*, 1*b*, 1*c*, 1*d*, 1*e*, and 1*f* may be, for example, a coaxial method or a non-coaxial method. Examples of the coaxial method include a method of measuring the time of flight (TOF) of an optical pulse, a method of measuring the arrival time of the modulated laser beam, a method using the coherence of laser light, and the like. The non-coaxial method includes, for example, triangulation, a stereo camera method, a moiré method, and the like.

In addition, a type of communication performed by the communication unit 25 provided in each of the movable position measurement devices 1, 1*a*, 1*b*, 1*c*, 1*d*, 1*e*, and 1*f* in the above-described embodiment is not limited to the type described in each embodiment. The communication unit 25 may perform various types of wireless communication, optical wireless communications, and wired communications using radio waves. The various types of wireless communication include near-field wireless communication.

In addition, a part of each of the movable position measurement devices 1, 1*a*, 1*b*, 1*c*, 1*d*, 1*e*, and 1*f* in the above-described embodiment, for example, the control unit 22 and the calculation unit 26, may be configured to be implemented in a computer. In this case, this control function may be implemented by recording a program for implementing the control function on a computer-readable recording medium and causing a computer system to read and execute the program recorded on the recording medium. In addition, the "computer system" used herein is assumed to include an operating system (OS) and hardware such as peripheral equipment in the computer system embedded in the movable position measurement devices 1, 1*a*, 1*b*, 1*c*, 1*d*, 1*e*, and 1*f*. Also, the "computer-readable recording medium" refers to a flexible disk, a magneto-optical disc, a read-only memory (ROM), a portable medium such as a compact disc (CD)-ROM, or a storage device such as a hard disk embedded in the computer system. Furthermore, the "computer-readable recording medium" may include a computer-readable recording medium for dynamically holding the program for a short time period as in a communication line when the program is transmitted via a network such as the Internet or a communication circuit such as a telephone circuit and a computer-readable recording medium for holding the program for a given time period as in a volatile memory inside the computer system serving as a server or a client when the program is transmitted. Also, the above-described program may be a program for implementing some of the above-described functions. Furthermore, the above-described program may be a program capable of implementing the above-described function in combination with a program already recorded on the computer system.

Also, some or all of the movable position measurement devices 1, 1*a*, 1*b*, 1*c*, 1*d*, 1*e*, and 1*f* in the above-described embodiments may be implemented as an integrated circuit such as a large-scale integration (LSI) circuit. Also, the functional blocks of the movable position measurement devices 1, 1*a*, 1*b*, 1*c*, 1*d*, 1*e*, and 1*f* in the above-described embodiments may be individually constructed as processors or some or all functional blocks may be integrated and constructed as processors. Also, a method of forming an integrated circuit is not limited to an LSI circuit, but may be implemented with dedicated circuits or general-purpose processors. Also, in the case where the integrated circuit technology which is substituted for an LSI circuit appears due to the advance of the semiconductor technology, an integrated circuit based on the technology may be used.

Although embodiments of the present invention have been described above in detail with reference to the drawings, specific configurations are not limited to the embodiments and design changes and the like may also be included without departing from the spirit and scope of the present invention.

Also, it will be appreciated by those skilled in the art that the plurality of embodiments or the modified examples thereof described above are specific examples of the following aspects.

Appendix 1

A measurement device includes a movement device capable of movement; an irradiation unit provided in the movement device and configured to irradiate measurement light to a reflective element; a light reception unit provided in the movement device and configured to receive reflected light of the measurement light from the reflective element; and a measurement unit configured to acquire position information or distance information about the reflective element on the basis of a light reception result of the light reception unit.

Appendix 2

The measurement device further includes a first detection unit configured to receive light from a space where the reflective element is arranged; and a movement unit configured to discriminate a position of the reflective element serving as a measurement target on the basis of a detection result of the first detection unit and drive the irradiation unit so that the measurement light is irradiated to the reflective element.

Appendix 3

The measurement device further includes a second detection unit configured to receive light from the space where the reflective element is arranged, wherein the movement unit discriminates a position of the reflective element serving as a measurement target on the basis of a detection result of the second detection unit and moves an irradiation direction of the measurement light.

Appendix 4

The measurement device further includes a third detection unit configured to receive light from a space where a measurement target object on which the reflective element is provided is arranged; and a detection direction movement unit configured to move a detection direction of the second detection unit on the basis of a detection result of the third detection unit.

Appendix 5

In the measurement device, the first detection unit includes at least a photodiode array, the second detection unit includes a first imaging unit, and the third detection unit includes a second imaging unit having a wider imaging range than the first imaging unit.

Appendix 6

In the measurement device, the reflective element is arranged in a robot or a machine tool.

Appendix 7

In the measurement device, the measurement light is an optical frequency comb.

Appendix 8

A position measurement method using a position measurement device including a movement device capable of movement; a position measurement unit including an irradiation unit configured to irradiate measurement light to a reflective element arranged on a movable unit of a robot, a light reception unit configured to receive reflected light, a position information acquisition unit configured to acquire position information of the reflective element, and a movement unit configured to change an irradiation direction of the measurement light; an imaging unit; and a transmission unit configured to transmit the position information acquired by the position information acquisition unit or adjustment information of the robot based on the position information to a control system of the robot, the movement device including at least the irradiation unit, the light reception unit, the movement unit, and the imaging unit, the position measurement method including: controlling the movement unit so that one or both of at least a part of the robot and the reflective element are imaged using the imaging unit and the measurement light is irradiated to the reflective element on the basis of an imaging result of the imaging unit; radiating, by the irradiation unit, the measurement light to the reflective element; receiving, by the light reception unit, the reflected light; and acquiring, by the position information acquisition unit, position information of the reflective element.

Appendix 9

A measurement method using a measurement device including a movement device capable of movement; an irradiation unit arranged in the movement device and configured to irradiate measurement light to a reflective element, a light reception unit arranged in the movement device and configured to receive reflected light of the measurement light from the reflective element, and a measurement unit configured to acquire position information or distance information about the reflective element on the basis of a light reception result of the light reception unit, the measurement method including: radiating, by the irradiation unit, the measurement light to the reflective element; receiving, by the light reception unit, the reflected light of the measurement light from the reflective element, and acquiring, by the measurement unit, position information or distance information about the reflective element on the basis of a light reception result of the light reception unit.

Appendix 10

A measurement method using a measurement device including a movement device capable of movement; a first irradiation unit provided in the movement device and configured to irradiate first measurement light to a first reflective element provided in a measurement target object; a reference irradiation unit provided in the movement device and configured to irradiate reference measurement light to a reference reflective element relating to a reference position in a space where the movement device is arranged; and a measurement unit configured to acquire position information or distance information about the first reflective element for the reference position on the basis of first reflected light of the first measurement light from the first reflective element and reference reflected light of the reference measurement light from the reference reflective element, the measurement method including: radiating, by the first irradiation unit, the first measurement light to the first reflective element; radiating, by the reference irradiation unit, the reference measurement light to the reference reflective element; and acquiring, by the measurement unit, the position information or the distance information about the first reflective element for the reference position on the basis of the first reflected light of the first measurement light from the first reflective element and the reference reflected light of the reference measurement light from the reference reflective element.

Appendix 11

A measurement method using a measurement device including a movement device capable of movement, an irradiation unit provided in the movement device and configured to irradiate measurement light to a reference reflective element relating to a reference position in a space where the movement device is arranged and irradiate measurement light to a first reflective element provided in a measurement target object, and a measurement unit configured to acquire position information or distance information about the first reflective element for the reference position on the basis of first reflected light of the measurement light from the first reflective element and reference reflected light of the measurement light from the reference reflective element, the measurement method including: radiating, by the irradiation unit, the measurement light to the reference reflective element and radiating the measurement light to the first reflective element; and acquiring, by the measurement unit, the position information or the distance information about the first reflective element for the reference position on the basis of the first reflected light of the measurement light from the first reflective element and the reference reflected light of the measurement light from the reference reflective element.

REFERENCE SIGNS LIST

1, 1*a*, 1*b*, 1*c*, 1*d*, 1*e*, 1*f* Movable position measurement device
11 Optical frequency comb interferometer
25 Communication unit
23 First imaging unit
20 Position measurement unit
201 Irradiation direction movement unit
4, 4*c* Reflective element

The invention claimed is:

1. A position measurement device comprising:

a light source configured to irradiate measurement light to a reflective element arranged on a movable part of a robot;

a photodetector configured to receive reflected light from the reflective element;

circuitry configured to acquire position information of the reflective element;

at least one actuator configured to change an irradiation direction of the measurement light;

a housing having a space for propagating measurement light and reflected light inside the housing;

a camera outside the housing; and a transmitter configured to transmit the position information or adjustment information of the robot based on the position information to a control system of the robot, wherein the at least one actuator is controlled so that one or both of at least a part of the robot and the reflective element are imaged using the camera and the measurement light is irradiated to the reflective element based on an imaging result of the camera.

2. A position measurement device comprising:

a light source configured to irradiate measurement light to a reflective element arranged on a movable part of a robot;

a photodetector configured to receive reflected light from the reflective element;

circuitry configured to acquire position information of the reflective element based on a light reception result of the photodetector;

at least one actuator configured to change an irradiation direction of the measurement light;

a housing having a space for propagating measurement light and reflected light inside the housing;

a camera outside the housing configured to image one or both of at least a part of the robot and the reflective element;

a transmitter configured to transmit the position information or adjustment information of the robot based on the position information to a control system of the robot; and wherein the at least one actuator is controlled so that the measurement light is irradiated to the reflective element based on an imaging result of the camera.

3. The position measurement device according to claim 1, wherein the camera is a first camera, wherein the position measurement device further comprises:

a second camera different from the first camera, wherein the circuitry is further configured to discriminate a position of the robot serving as a measurement target based on an imaging result of the second camera and make an adjustment so that the imaging direction of the first camera is directed to the position of the robot, and wherein the at least one actuator discriminates a position of the reflective element serving as a measurement target based on an imaging result of the first camera and drive the light source to irradiate the measurement light to the reflective element.

4. The position measurement device according to claim 3, wherein an imaging range of the second camera is wider than an imaging range of the first camera.

5. The position measurement device according to claim 3, wherein the at least one actuator drives the light source to track the reflective element serving as the measurement target based on the basis of the imaging result of the first camera.

6. The position measurement device according to claim 3, wherein the circuitry is further configured to adjust the imaging direction of the first camera to track the robot serving as the measurement target based on the imaging result of the second camera.

7. The position measurement device according to claim 6, wherein an optical path of at least a part of an optical system for an imaging process of the first camera is identical to an optical path of at least a part of an optical system for a light reception process of the photodetector.

8. The position measurement device according to claim 1, wherein the light source irradiates the measurement light to the reflective element after the movement device stops.

9. The position measurement device according to claim 1, further comprising a sensor configured to detect vibrations of at least a part of the position measurement device, wherein the light source irradiates the measurement light to the reflective element based a detection result of the sensor.

10. The position measurement device according to claim 9, wherein the measurement light is irradiated to the reflective element when the amount of vibration detected is smaller than a predetermined amount.

11. The position measurement device according to claim 9, wherein the circuitry is further configured to acquire information about a position of the reflective element based on a light reception result of the photodetector when the amount of vibration detected is smaller than a predetermined amount.

12. The position measurement device according to claim 1, further comprising a grooved holder configured to detachably hold the reflective element, wherein the grooved holder is provided in the movement device.

13. The position measurement device according to claim 1, wherein the adjustment information includes a control signal for controlling the robot and the adjustment information is transmitted to the control system of the robot through wireless communication.

14. The position measurement device according to claim 1, wherein the circuitry is further configured to acquire information about a coordinate system in a space where the robot is arranged and generate coordinate position information of the robot in the coordinate system based on the information about the coordinate system.

15. The position measurement device according to claim 1, wherein the circuitry is further configured to acquire information about a reference position in a space where the robot is arranged, wherein the measurement light is first measurement light, wherein the light source is a first light source, wherein the reflective element is a first reflective element, wherein the photodetector is a first photodetector, the position measurement device further comprising:

a first reference light source configured to irradiate first reference measurement light to a first reference reflective element relating to the reference position;

a second reference light source configured to irradiate second reference measurement light to a second reference reflective element relating to the reference position;

a third reference light source configured to irradiate third reference measurement light to a third reference reflective element relating to the reference position; and a reference photodetector configured to receive first reference reflected light from the first reference reflective element, second reference reflected light from the second reference reflective element, and third reference reflected light from the third reference reflective element, and wherein position information for the reference position of the first reflective element is generated based on a light reception result of the first photodetector and a light reception result of the reference photodetector.

16. The position measurement device according to claim 1, wherein the reflective element is a first reflective element, wherein the at least one actuator adjusts the irradiation direction so that the measurement light is directed to a reference reflective element relating to a reference position, wherein the photodetector receives reference reflected light from the reference reflective element, and wherein the circuitry is further configured to generate position information about the reference position of the first reflective element based on a light reception result of the photodetector.

17. The position measurement device according to claim 1, further comprising a sensor configured to detect vibrations of at least a part of the position measurement device, wherein the circuitry is further configured to generate information about the reference position based on a detection result of the sensor.

18. The position measurement device according to claim 17, wherein the information about the reference position is generated when the amount of vibration detected is smaller than a predetermined amount.

19. The position measurement device according to claim 3, wherein the second camera is included outside of a housing of the position measurement device.

20. A position measurement method with a position measurement device, wherein the position measurement device includes:

a light source configured to irradiate measurement light to a reflective element arranged on a movable part of a robot;

a photodetector configured to receive reflected light from the reflective element;

circuitry configured to acquire position information of the reflective element;

at least one actuator configured to change an irradiation direction of the measurement light;

a housing having a space for propagating measurement light and reflected light inside the housing;

a camera outside the housing; and a transmitter configured to transmit the position information or adjustment information of the robot based on the position information to a control system of the robot, the position measurement method comprising:

moving at least one of the light source, the photodetector, the at least one actuator, and the camera;

controlling the at least one actuator so that one or both of at least a part of the robot and the reflective element are imaged using the camera; and irradiating the measurement light to the reflective element based on an imaging result of the camera.

* * * * *